(12) United States Patent
Baldwin et al.

(10) Patent No.: US 10,367,341 B1
(45) Date of Patent: Jul. 30, 2019

(54) CONFIGURABLE ELECTRICAL OUTLET COVER ENCLOSURE

(71) Applicants: Jeffrey P. Baldwin, Phoenix, AZ (US); John Klein, Chandler, AZ (US)

(72) Inventors: Jeffrey P. Baldwin, Phoenix, AZ (US); John Klein, Chandler, AZ (US)

(*) Notice: Subject to any disclaimer, the term of this patent is extended or adjusted under 35 U.S.C. 154(b) by 0 days.

(21) Appl. No.: 15/944,689

(22) Filed: Apr. 3, 2018

Related U.S. Application Data

(63) Continuation of application No. 15/265,837, filed on Sep. 14, 2016, now Pat. No. 9,935,436.

(60) Provisional application No. 62/218,374, filed on Sep. 14, 2015.

(51) Int. Cl.
*H02G 3/08* (2006.01)
*H02G 3/10* (2006.01)
*H02G 3/14* (2006.01)

(52) U.S. Cl.
CPC ............ *H02G 3/083* (2013.01); *H02G 3/10* (2013.01); *H02G 3/14* (2013.01)

(58) Field of Classification Search
CPC ............ H02G 3/083; H02G 3/10; H02G 3/14
USPC .................................................... 174/67
See application file for complete search history.

(56) References Cited

U.S. PATENT DOCUMENTS

| 5,445,539 | A | 8/1995 | Dale |
| 6,737,576 | B1 * | 5/2004 | Dinh .................. H02G 3/088 174/480 |
| 7,541,540 | B1 | 6/2009 | Shotey et al. |

* cited by examiner

*Primary Examiner* — Dhiru R Patel
(74) *Attorney, Agent, or Firm* — Booth Udall Fuller, PLC

(57) ABSTRACT

An electrical outlet cover with a lid having a configurable protrusion or recess to accommodate different uses and weather resistance states. The electrical outlet cover includes a base coupled to an electrical outlet and a lid hingedly coupled to the base along a first side. The lid includes a frame with a central aperture and a telescoping enclosure with a flange at a front edge of a sleeve, the flange extending outward from the sleeve. The sleeve may include a ledge extending outward from the sleeve adjacent a back edge of the sleeve on at least two sides of the sleeve. The sleeve is slidably coupled within the central aperture and movable between an expanded position and a collapsed position. The flange may abut the frame in the collapsed position and the ledge may abut the frame in the expanded position.

8 Claims, 34 Drawing Sheets

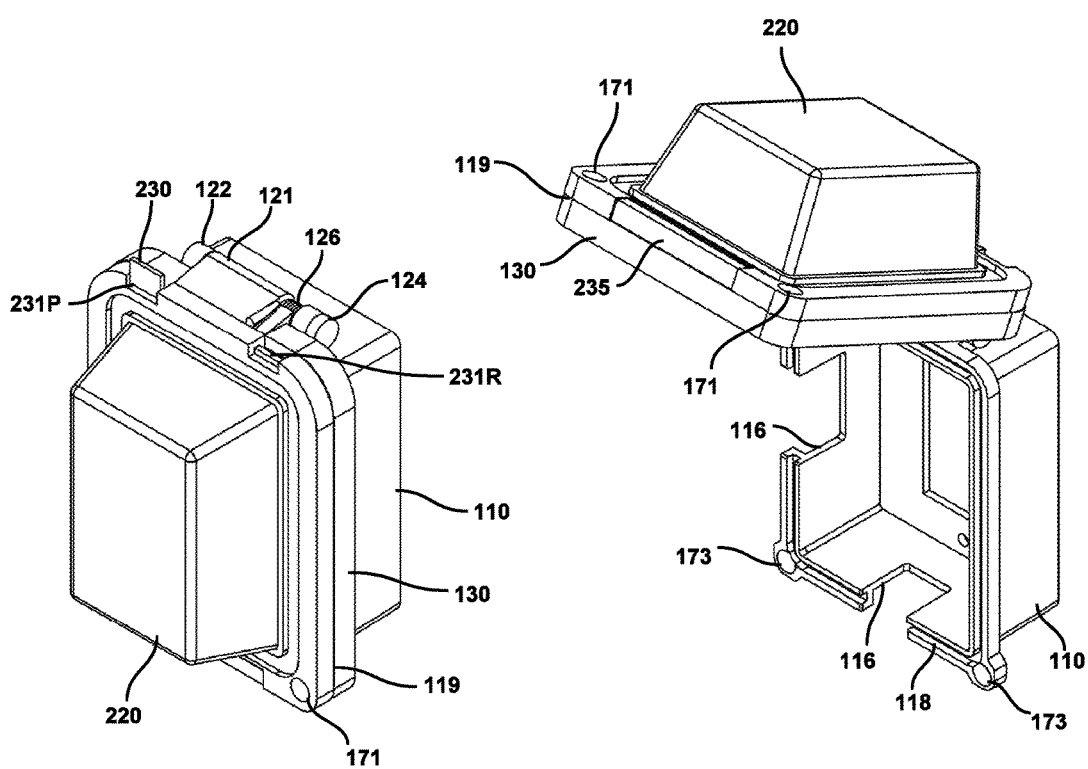

SECTION B-B

SECTION A-A

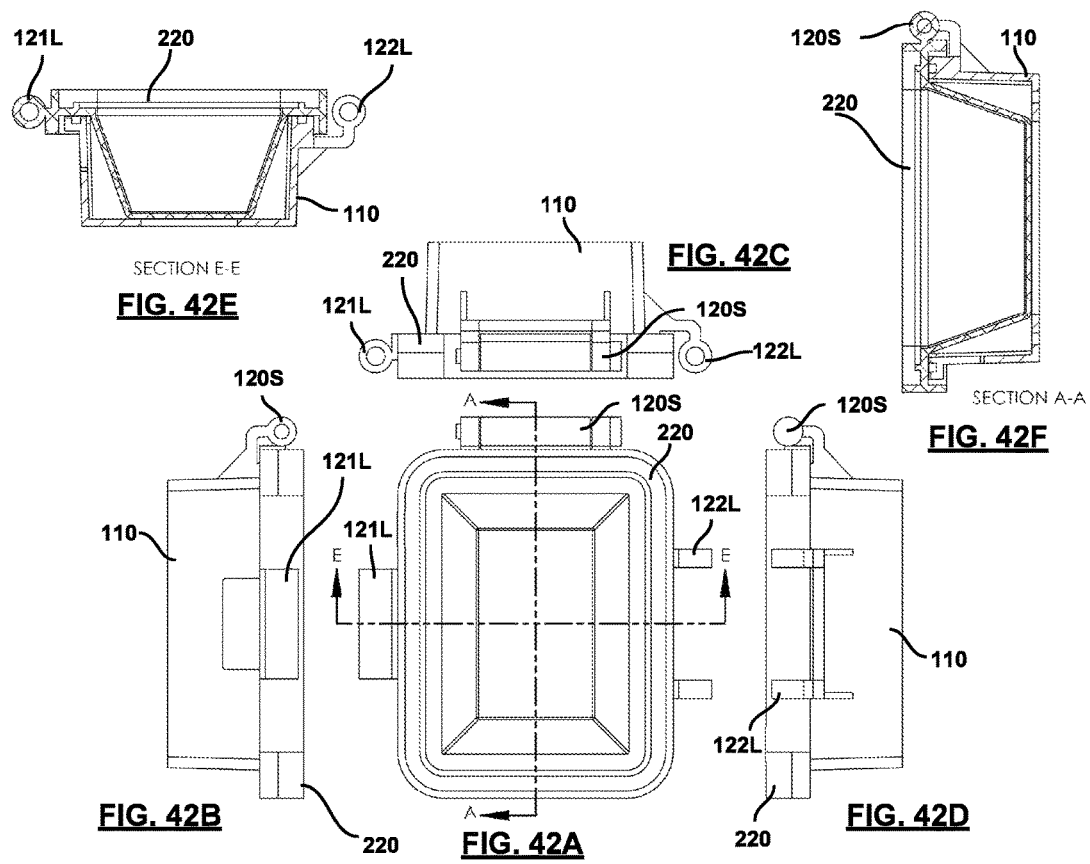

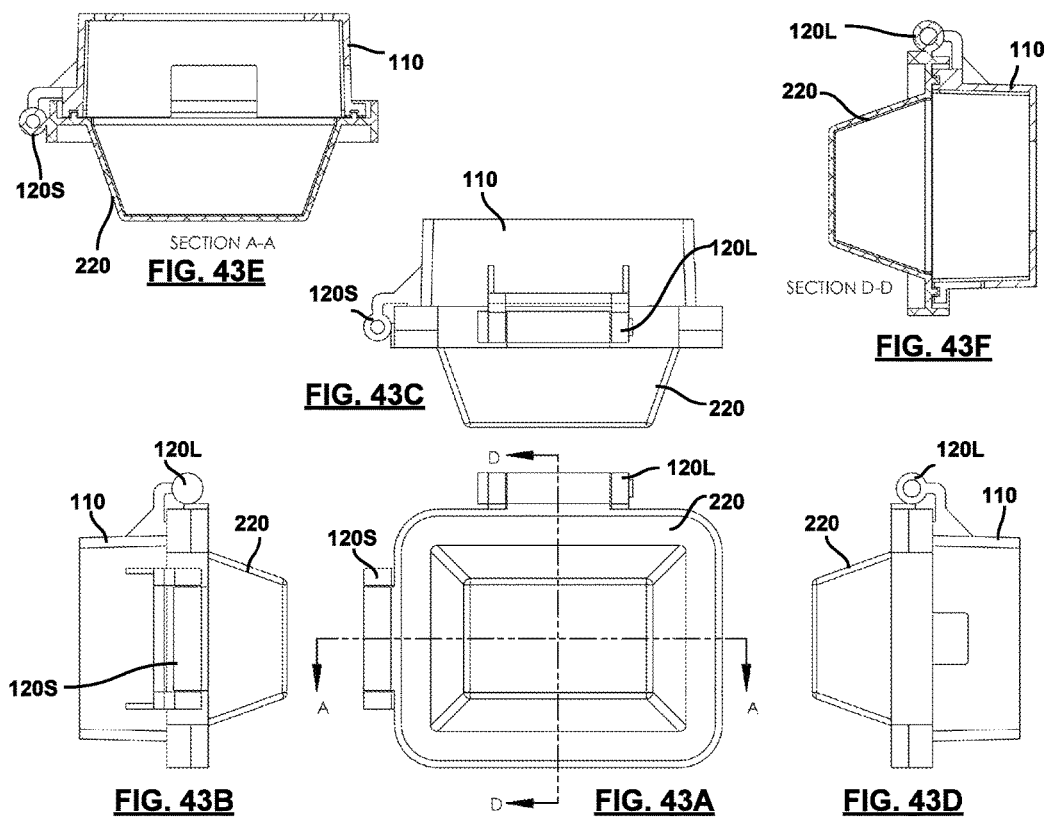

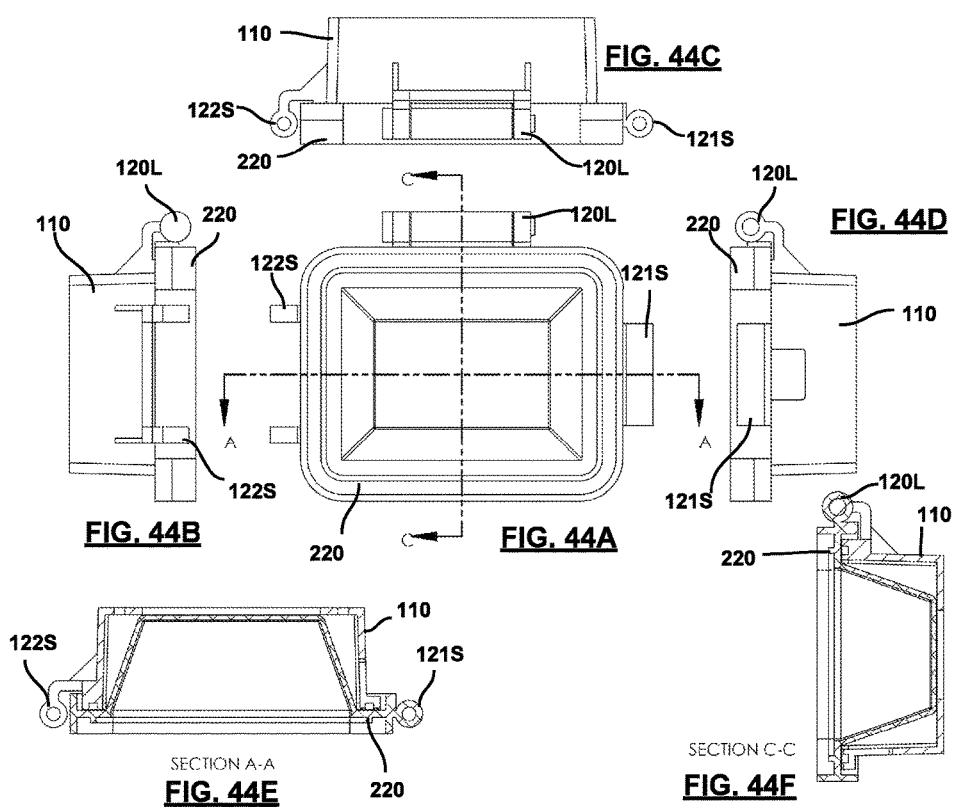

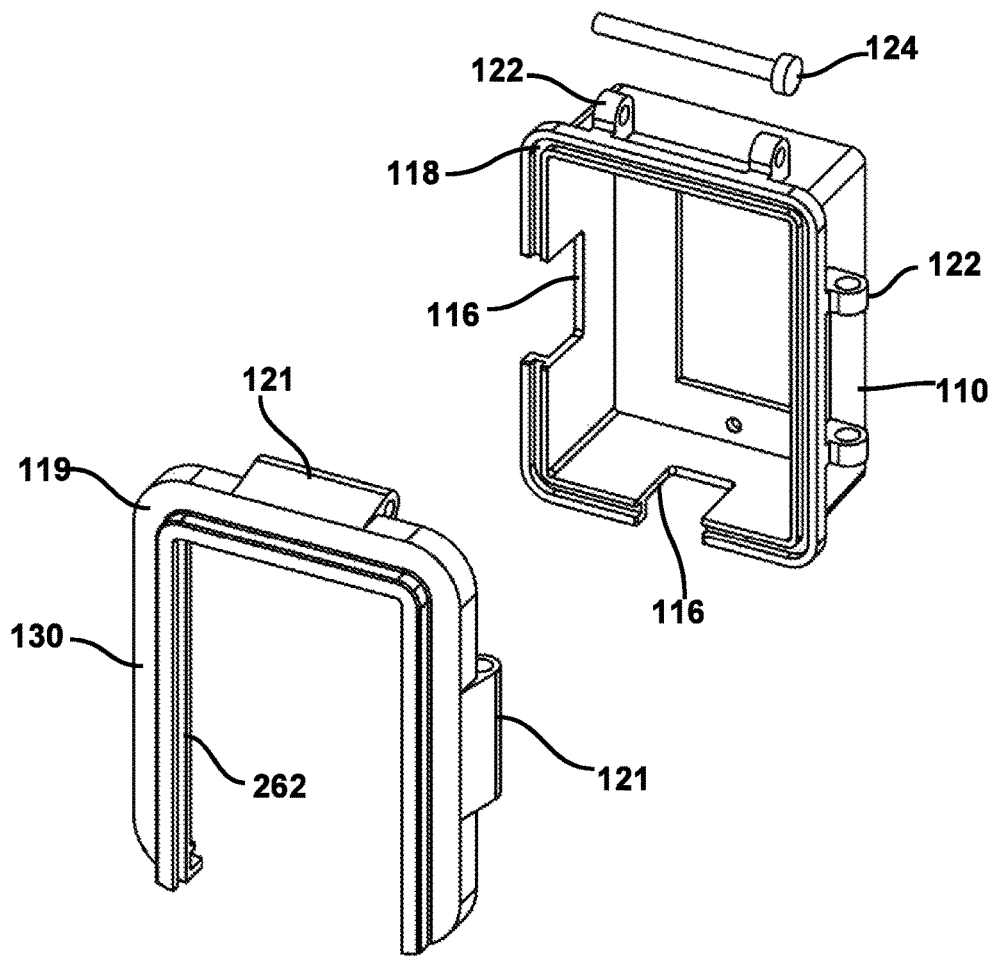
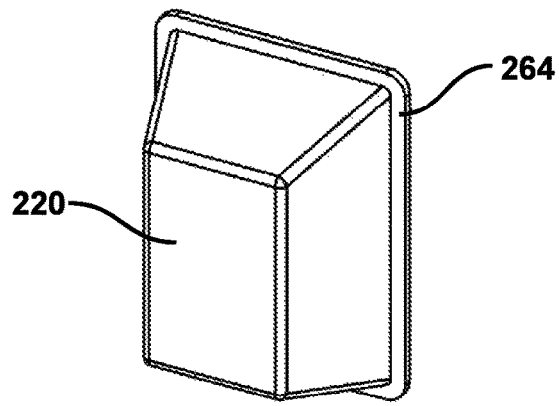
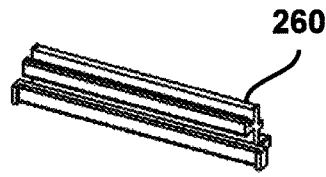
FIG. 45

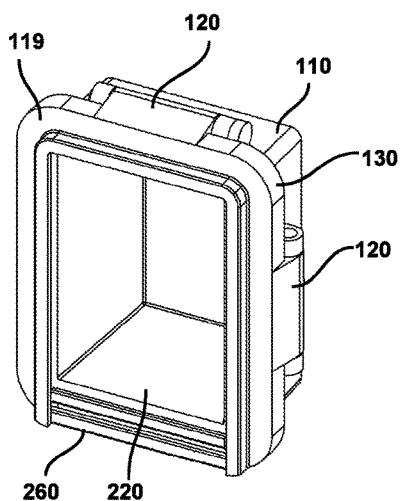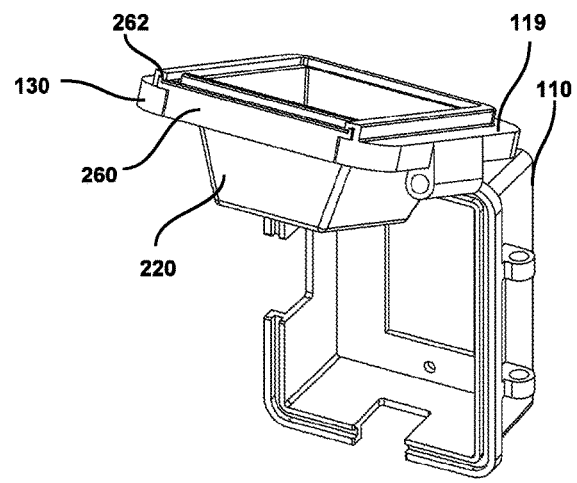
FIG. 48  FIG. 49

CONFIGURABLE ELECTRICAL OUTLET COVER ENCLOSURE

CROSS REFERENCE TO RELATED APPLICATIONS

This application is a continuation application of U.S. Utility patent application Ser. No. 15/265,837 entitled "Configurable Electrical Outlet Cover Enclosure" to Jeffrey P. Baldwin that was filed on Sep. 14, 2016 and issues as U.S. Pat. No. 9,935,436 on Apr. 3, 2018, which application claims the benefit of the filing date of U.S. Provisional Patent Application 62/218,374 entitled "Configurable Enclosure" to Jeffrey P. Baldwin that was filed on Sep. 14, 2015, the contents of which are hereby incorporated herein by reference.

BACKGROUND

1. Technical Field

Aspects of this document relate generally to configurable enclosures to cover an electrical outlet.

2. Background Art

Outlet covers are used on exterior electrical outlets to reduce or prevent water, dirt, or other contaminants from entering the electrical outlet. Outlet covers for the exterior of buildings are typically large and boxy because they have sufficient space to allow one or more power plugs to plug into sockets while the outlet cover is closed. Many outlet covers may be attached to electrical outlets that are rarely used. A need exists for outlet covers that can collapse or be configured to take up less space.

SUMMARY

Aspects of this document relate to electrical outlet covers. These aspects may comprise, and implementations may include, one or more or all of the components and steps set forth in the appended claims, which are hereby incorporated by reference. In one aspect, a cover for an electrical outlet may comprise a base configured to couple to an electrical outlet, a lid hingedly coupled to the base along a first side and pivotable between an open position and a closed position, the lid comprising a frame comprising a central aperture, a telescoping enclosure comprising a flange at a front edge of a sleeve, the flange extending outward from the sleeve, the sleeve comprising a ledge extending outward from the sleeve adjacent a back edge of the sleeve on at least two sides of the sleeve, wherein the sleeve is slidably coupled within the central aperture and movable between an expanded position and a collapsed position, the flange abutting a front surface of the frame in the collapsed position, the ledge abutting the frame in the expanded position, a latch assembly comprising a first latch member affixed to the base and a second latch member affixed to the frame, and an aperture extending through the base sized large enough to receive a portion of an electrical device therethrough.

Particular embodiments and implementations may comprise one or more of the following features. An annular snap-fit fastener assembly comprising a ridge on the frame and at least one protrusion on the sleeve, the ridge encircling at least a portion of the central aperture, wherein the at least one protrusion traverses the ridge when moving the telescoping enclosure from the collapsed position to the expanded position. The back edge of the sleeve may abut the base in the collapsed position. A sealing ridge facing the lid and aligned with the sleeve, wherein the back edge of the sleeve abuts the base when the telescoping enclosure is in the collapsed position by abutting the base at a seat adjacent the sealing ridge. A foot assembly attached at a back portion of the sleeve, wherein the ledge is an upper surface of the foot assembly, the back edge of the sleeve is a bottom surface of the foot assembly opposite the top surface of the foot assembly, and the back edge of the sleeve abuts the base in the collapsed position. At least one runner on each of at least two opposing sides of the sleeve, and a plurality of separate channels in the frame adjacent the central aperture, each separate channel being slidably coupled to a separate one of the at least one runners, wherein each runner is short enough that when the telescoping enclosure is in the expanded position, each runner is not positioned in the channel. A cord port, and a cord port door sized and shaped to couple to the cord port, wherein the sleeve restricts passage of water into an interior of the sleeve when the cord port door is removed from the cord port and the telescoping enclosure is in the collapsed position by abutting the back edge of the sleeve to the base. A base locking aperture extending through the base and positioned in alignment with both a frame locking aperture extending through the frame and an enclosure locking aperture extending through the telescoping enclosure.

According to another aspect, a cover for an electrical outlet may comprise a base configured to couple to an electrical outlet, a lid hingedly coupled to the base along a first side and pivotable between an open position and a closed position, the lid comprising a frame comprising a central aperture a telescoping enclosure comprising a sleeve, the sleeve comprising a ledge extending outward from the sleeve adjacent a back edge of the sleeve on at least two sides of the sleeve, wherein the sleeve is slidably coupled within the central aperture and movable between an expanded position and a collapsed position, the back edge of the sleeve abutting the base in the collapsed position, the ledge abutting the frame in the expanded position, a latch assembly comprising a first latch member affixed to the base and a second latch member affixed to the frame, and an aperture extending through the base sized large enough to receive a portion of an electrical device therethrough.

Particular implementations or embodiments of the disclosure may comprise one or more of the following features. A flange at a front edge of the sleeve, the flange extending outward from the sleeve, wherein the flange abuts the frame in the collapsed position. A base locking aperture extending through the base positioned in alignment with both a frame locking aperture extending through the frame and an enclosure locking aperture extending through the telescoping enclosure. A cord port, and a cord port door sized and shaped to couple to the cord port, wherein the sleeve restricts passage of water into an interior of the sleeve when the cord port door is removed from the cord port and the telescoping enclosure is in the collapsed position by abutting the back edge of the sleeve to the base. A foot assembly attached at a back portion of the sleeve, wherein the ledge is an upper surface of the foot assembly, the back edge of the sleeve is a bottom surface of the foot assembly opposite the top surface of the foot assembly, and the back edge of the sleeve abuts the base in the collapsed position. A sealing ridge facing the lid and aligned with the sleeve, wherein the back edge of the sleeve abuts the base in the collapsed position by abutting the base at a seat adjacent the sealing ridge. At least one runner on each of at least two opposing sides of the sleeve, and a plurality of separate channels in the frame adjacent the central aperture, each separate channel being slidably coupled to a separate one of the at least one runners, wherein each runner is short enough that when the telescoping enclosure is in the expanded position, each runner is not positioned in the channel. An annular snap-fit fastener assembly comprising a ridge on the frame and at least one protrusion on the sleeve, the ridge encircling at least a portion of the central aperture, wherein the at least one protrusion traverses the ridge when moving from the collapsed position to the expanded position. The back edge of the sleeve may abut the base in the collapsed position.

According to another aspect, a cover for an electrical outlet may comprise a base configured to couple to an electrical outlet, a lid hingedly coupled to the base along a first side and pivotable between an open position and a closed position, the lid comprising a frame comprising a central aperture, an enclosure having a protruding bubble protruding outward from the frame in a first position and protruding towards the base in a second position, the bubble being rotated by 180° in at least one direction to move from the first position to the second position, a latch assembly comprising a first latch member affixed to the base and a second latch member affixed to the frame, and an aperture extending through the base sized large enough to receive a portion of an electrical device therethrough.

Particular implementations and embodiments may comprise one or more of the following features. The lid may be hingedly coupled to the base in a first orientation with the lid closed on the base when the bubble is in the first position, and the lid is hingedly coupled to the base in a second orientation different from the first orientation with the lid closed on the base and the bubble extending into the base when the bubble is in the second position. The first position may permit a power cord to couple to the electrical outlet and the second position may restrict the power cord from coupling to the electrical outlet.

The foregoing and other aspects, features, applications, and advantages will be apparent to those of ordinary skill in the art from the specification, drawings, and the claims. Unless specifically noted, it is intended that the words and phrases in the specification and the claims be given their plain, ordinary, and accustomed meaning to those of ordinary skill in the applicable arts. The inventors are fully aware that he can be his own lexicographer if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

The foregoing and other aspects, features, and advantages will be apparent to those of ordinary skill in the art from the specification, drawings, and the claims.

BRIEF DESCRIPTION OF THE DRAWINGS

Implementations will hereinafter be described in conjunction with the appended drawings, where like designations denote like elements, and:

FIG. 28 is a perspective view of the outlet cover assembly of FIG. 27 in the closed protruding position;

FIG. 29 is a perspective view of the outlet cover assembly of FIG. 27 in the open protruding position;

FIG. 42A is a front view of an outlet cover assembly of FIG. 35;

FIG. 42B is a first side view of FIG. 42A;

FIG. 42C is a second side view of FIG. 42A;

FIG. 42D is a third side view of FIG. 42A;

FIG. 42E is a sectional view of FIG. 42A;

FIG. 42F is a sectional view of FIG. 42A;

FIG. 43A is a front view of an outlet cover assembly of FIG. 37;

FIG. 43B is a first side view of FIG. 43A;

FIG. 43C is a second side view of FIG. 43A;

FIG. 43D is a third side view of FIG. 43A;

FIG. 43E is a sectional view of FIG. 43A;

FIG. 43F is a sectional view of FIG. 43A;

FIG. 44A is a front view of an outlet cover assembly of FIG. 39;

FIG. 44B is a first side view of FIG. 44A;

FIG. 44C is a second side view of FIG. 44A;

FIG. 44D is a third side view of FIG. 44A;

FIG. 44E is a sectional view of FIG. 44A;

FIG. 44F is a sectional view of FIG. 44A;

FIG. 45 is an exploded perspective view of an outlet cover assembly with bubble removable from a frame;

FIG. 48 is a perspective view of the outlet cover assembly of FIG. 45 in the closed receding position;

FIG. 49 is a perspective view of the outlet cover assembly of FIG. 45 in the open receding position;

Figure 1:
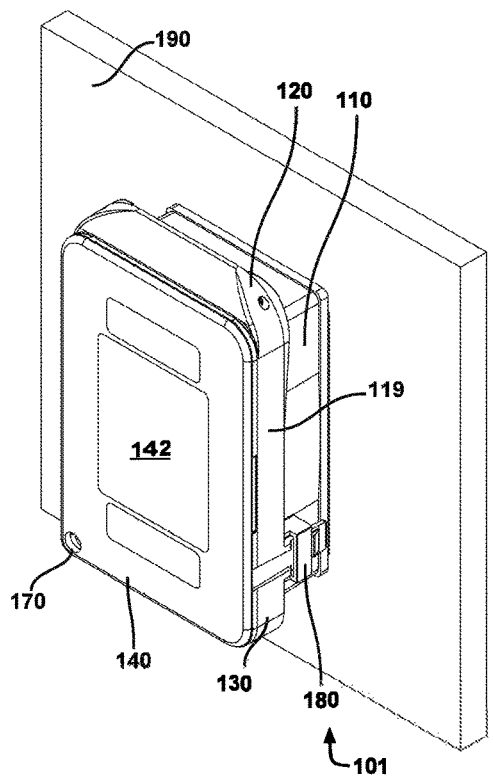
FIGS. 1 and 2 are perspective views of an outlet cover assembly in, respectively, closed collapsed and closed extended positions.
Figure 2:
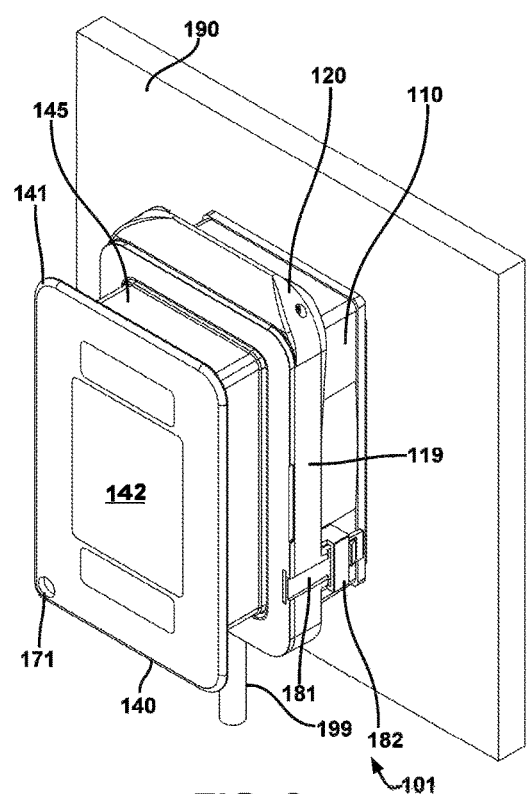
Figure 3:
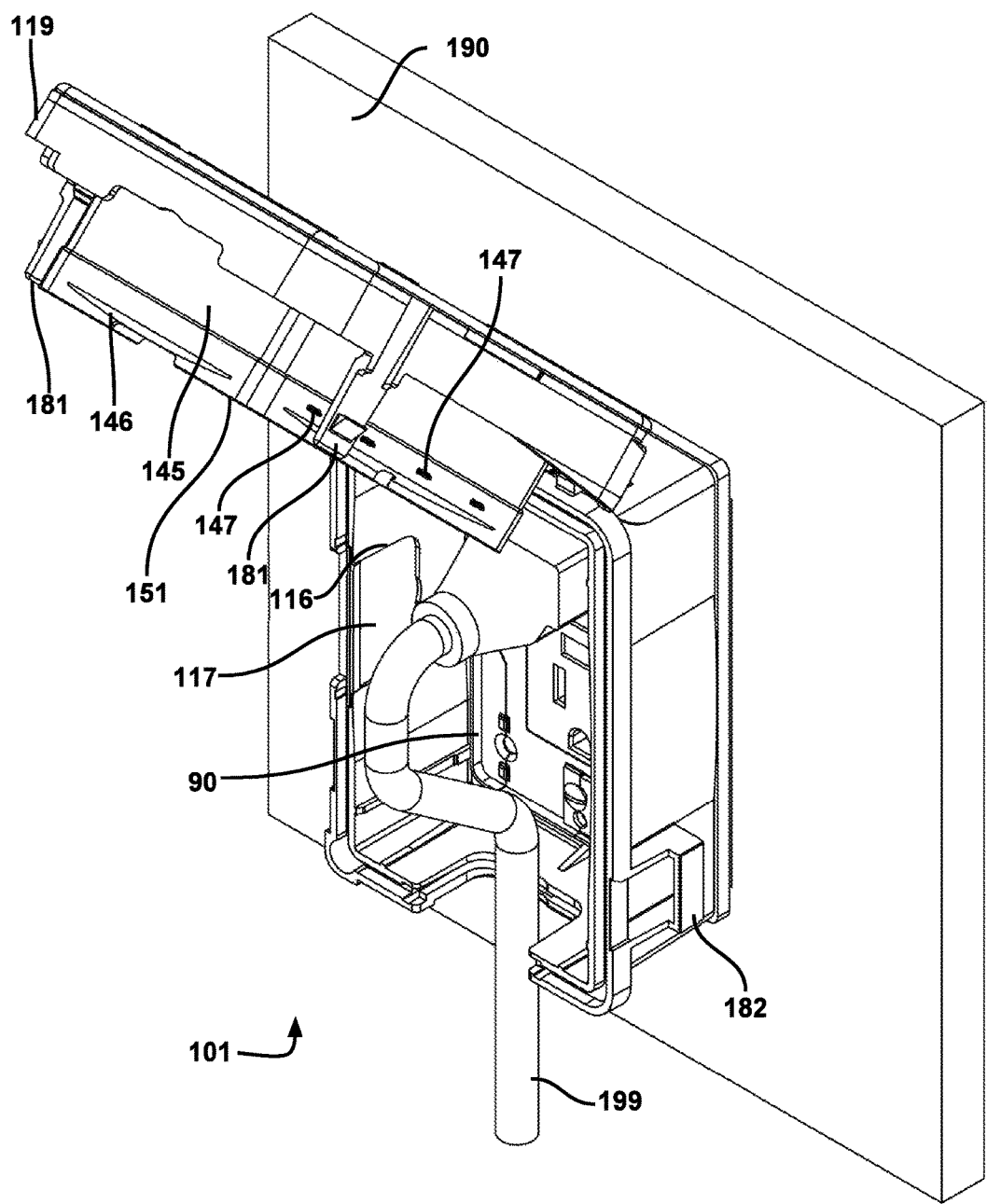
FIG. 3 is a perspective view of the outlet cover of FIG. 1 in an open position with the cover collapsed.
Figure 4:
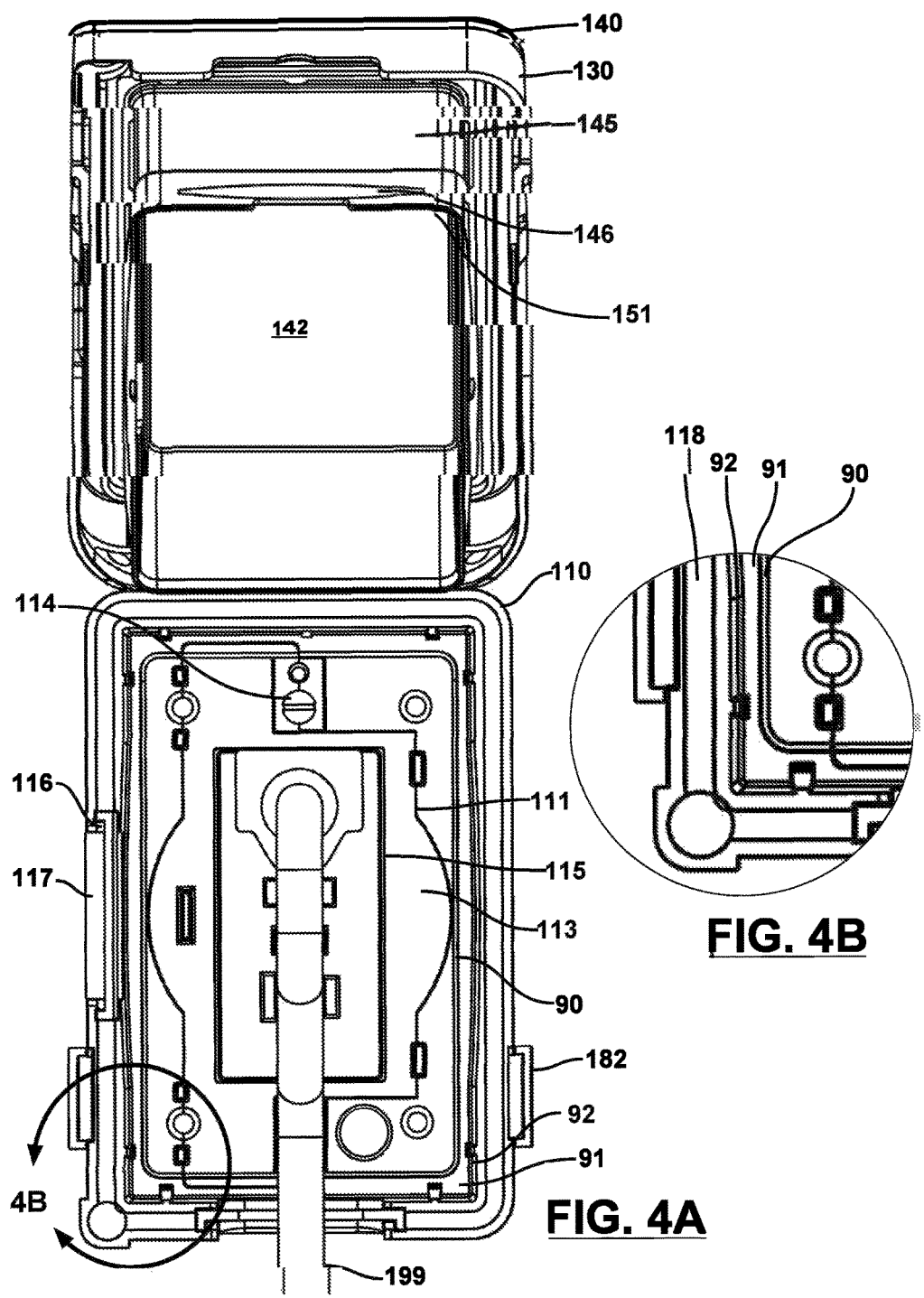
FIG. 4A is a front view of the outlet cover assembly of FIG. 3.
FIG. 4B is a break out view of the section 4B on FIG. 4A.
Figure 5:
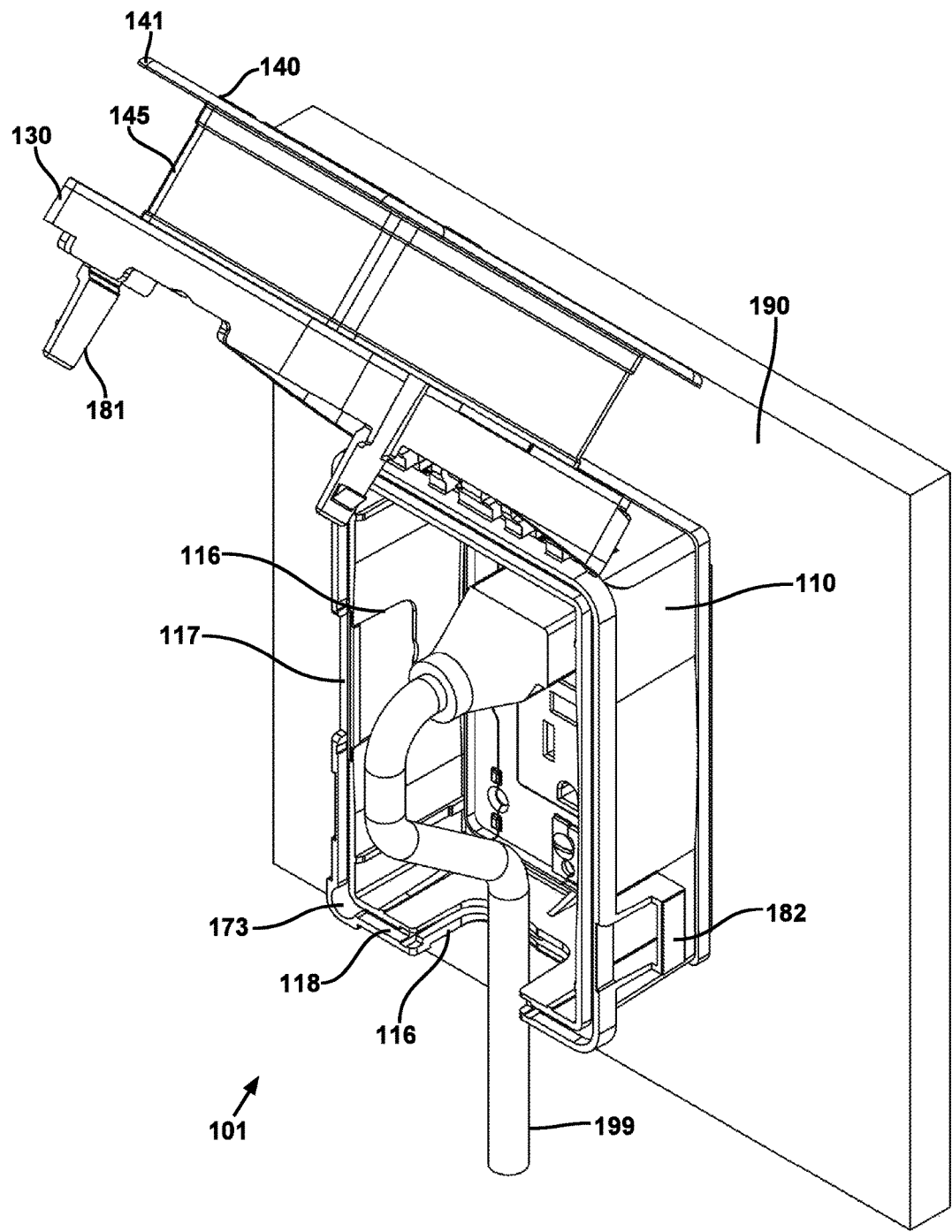
FIG. 5 is a perspective view of an outlet cover assembly of FIG. 1 in an open position with the cover expanded.
Figure 6:
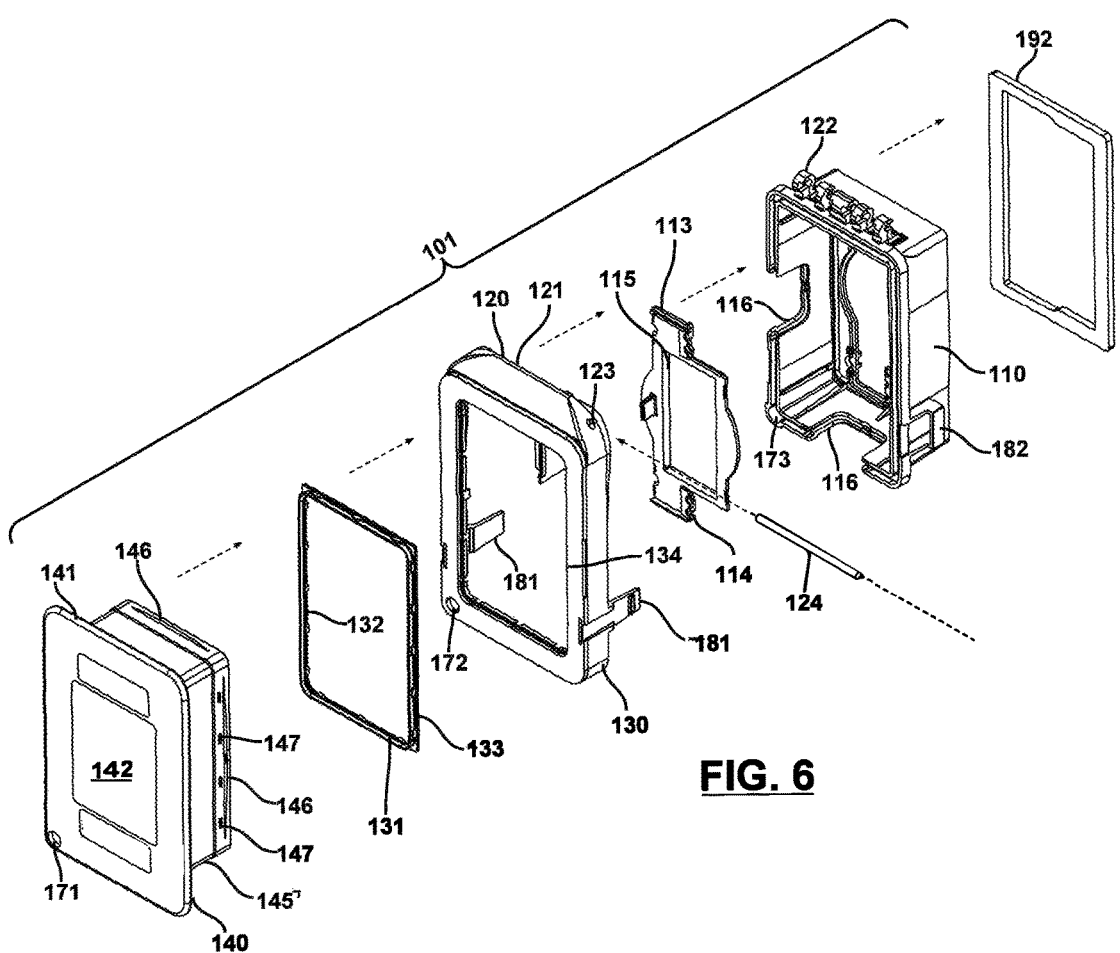
FIG. 6 is an exploded perspective view of the outlet cover assembly of FIG. 1.
Figure 7:
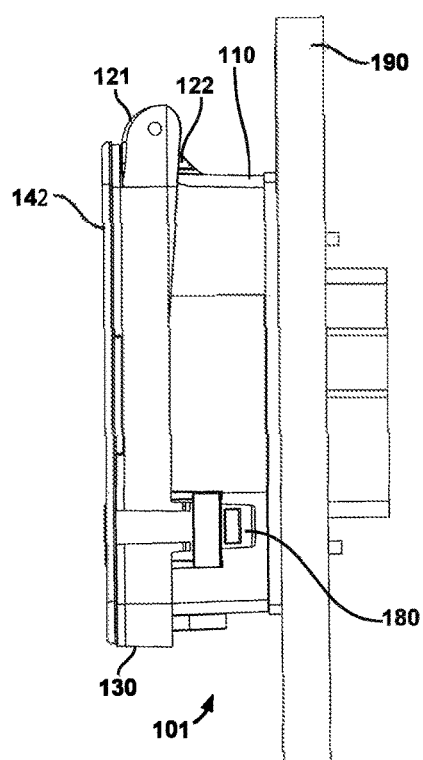
FIGS. 7 and 8 are side views of the outlet cover assembly of FIG. 1 in, respectively, closed collapsed and closed extended positions.
Figure 8:
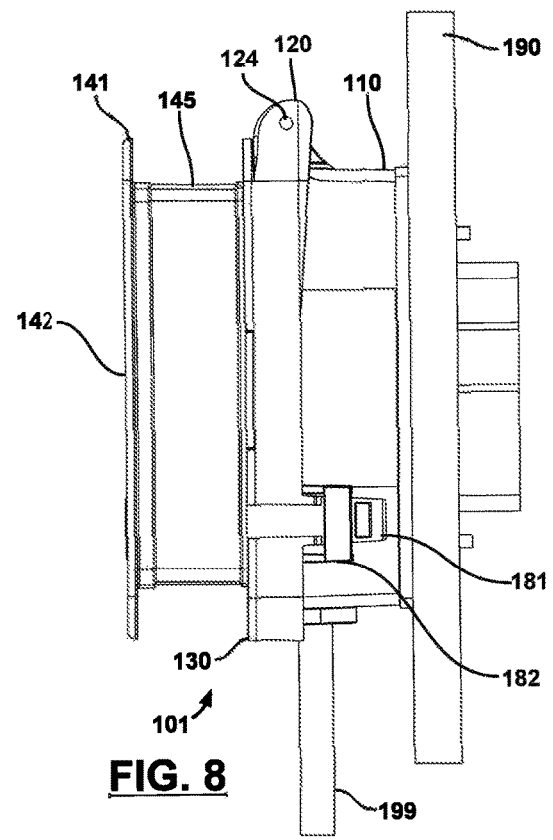
Figure 9:
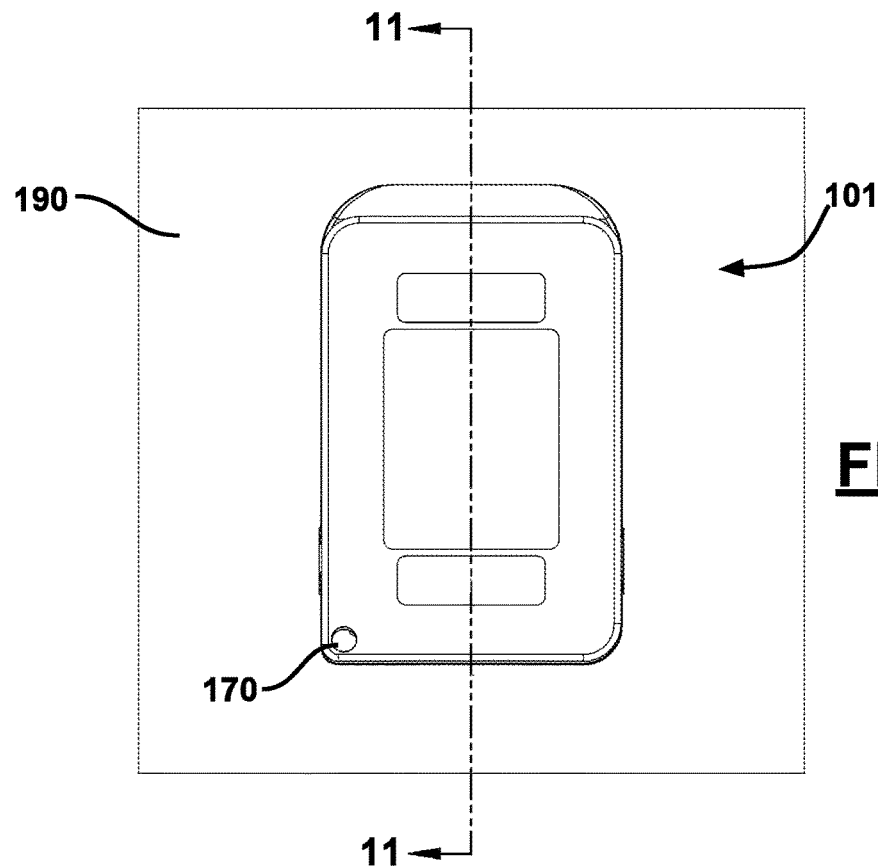
FIG. 9 is a front view of an outlet cover assembly of FIG. 1 shown mounted on a wall.
Figure 10:
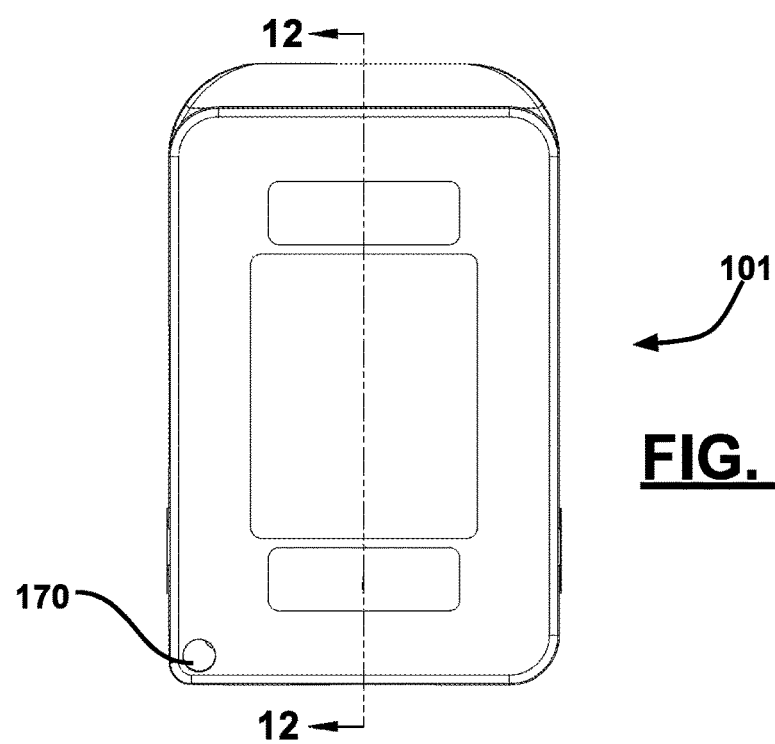
FIG. 10 is a front view of an outlet cover assembly of FIG. 1, not mounted on a wall.
Figure 11:
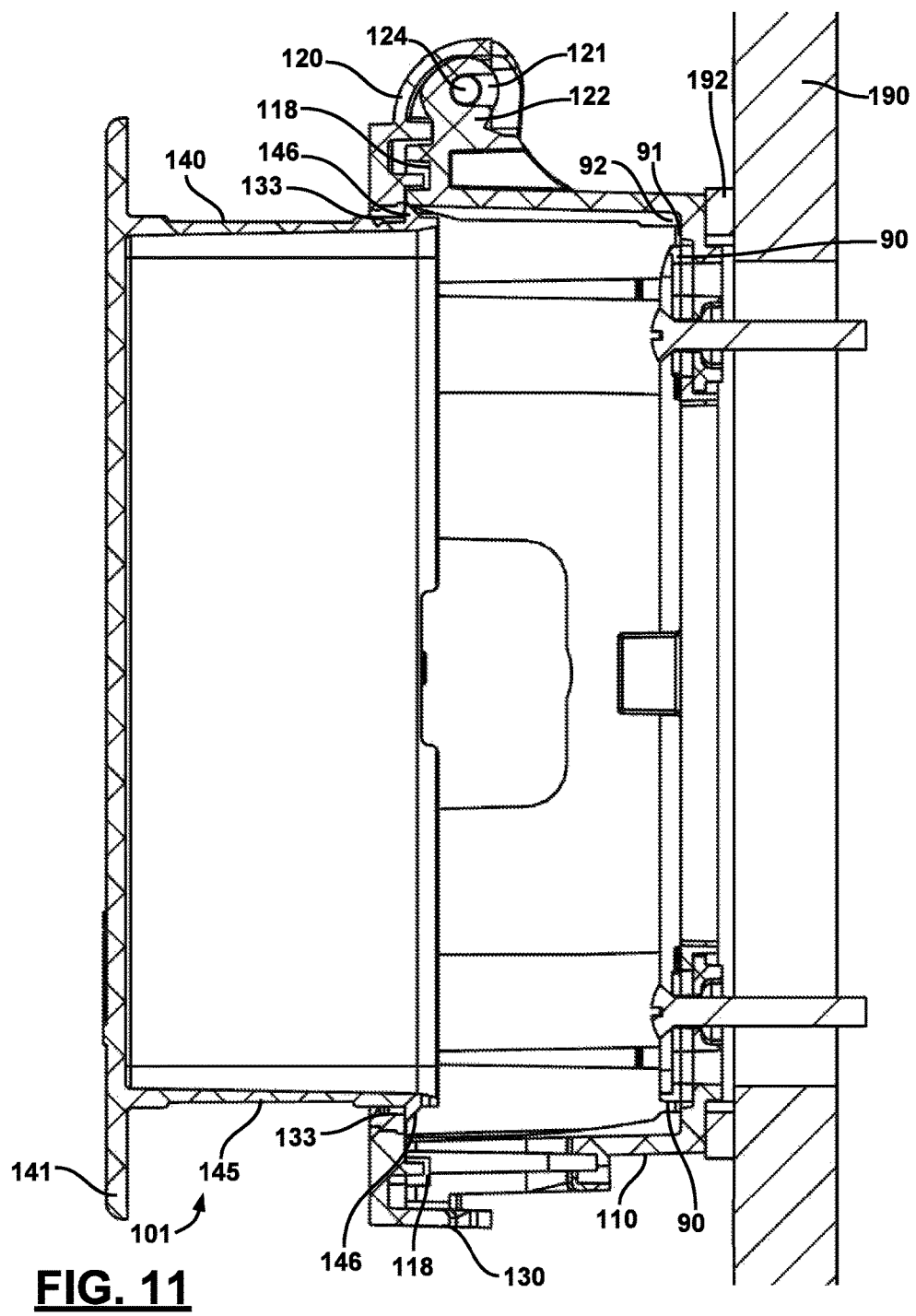
FIG. 11 is a sectional view of FIG. 9, with the section taken along section lines 11-11.
Figure 12:
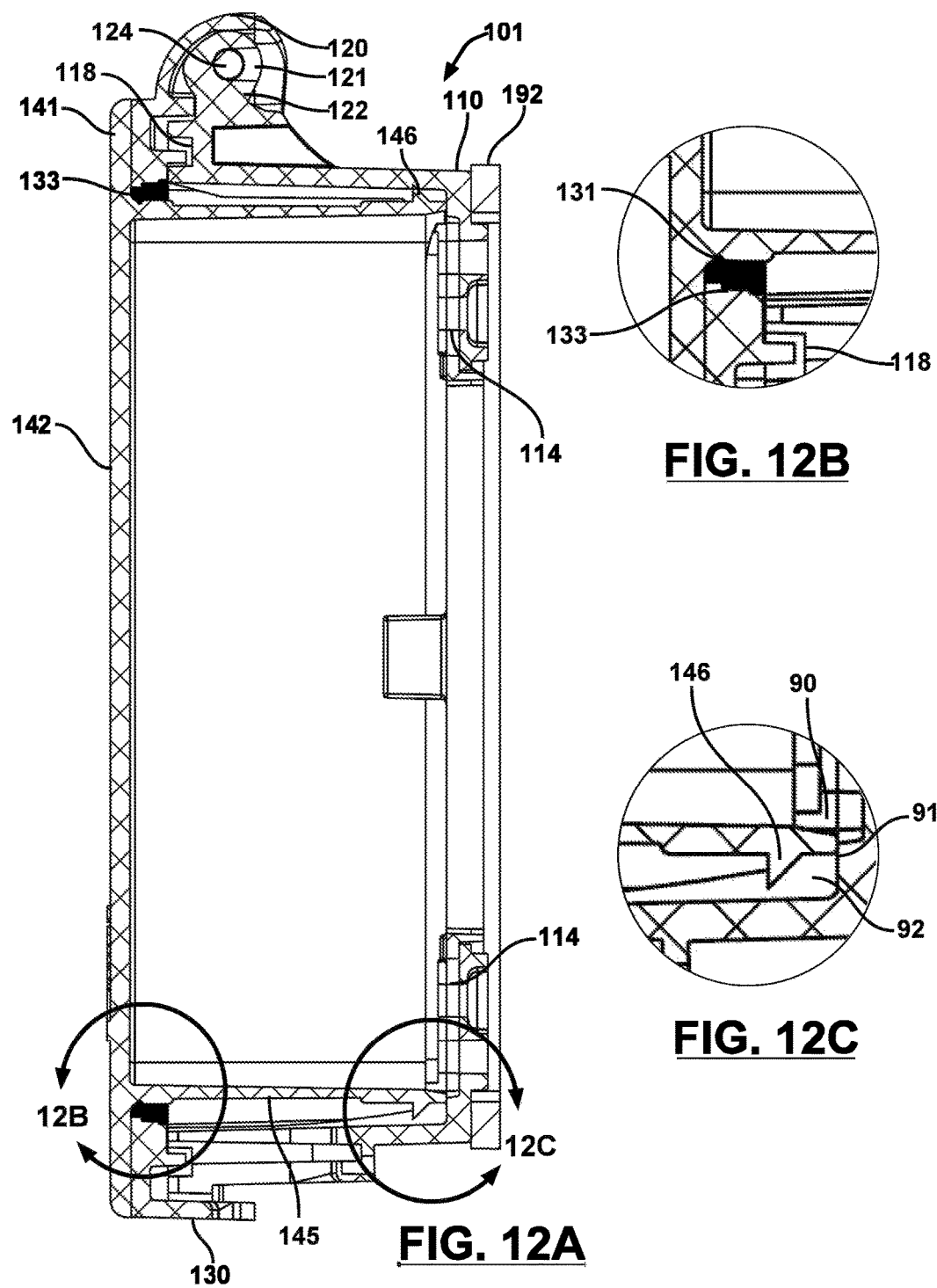
FIG. 12A is a sectional view of FIG. 10, with the section taken along section lines 12-12.
FIGS. 12B and 12C are break out views of, respectively, sections 12B and 12C on FIG. 12A.
Figure 13:
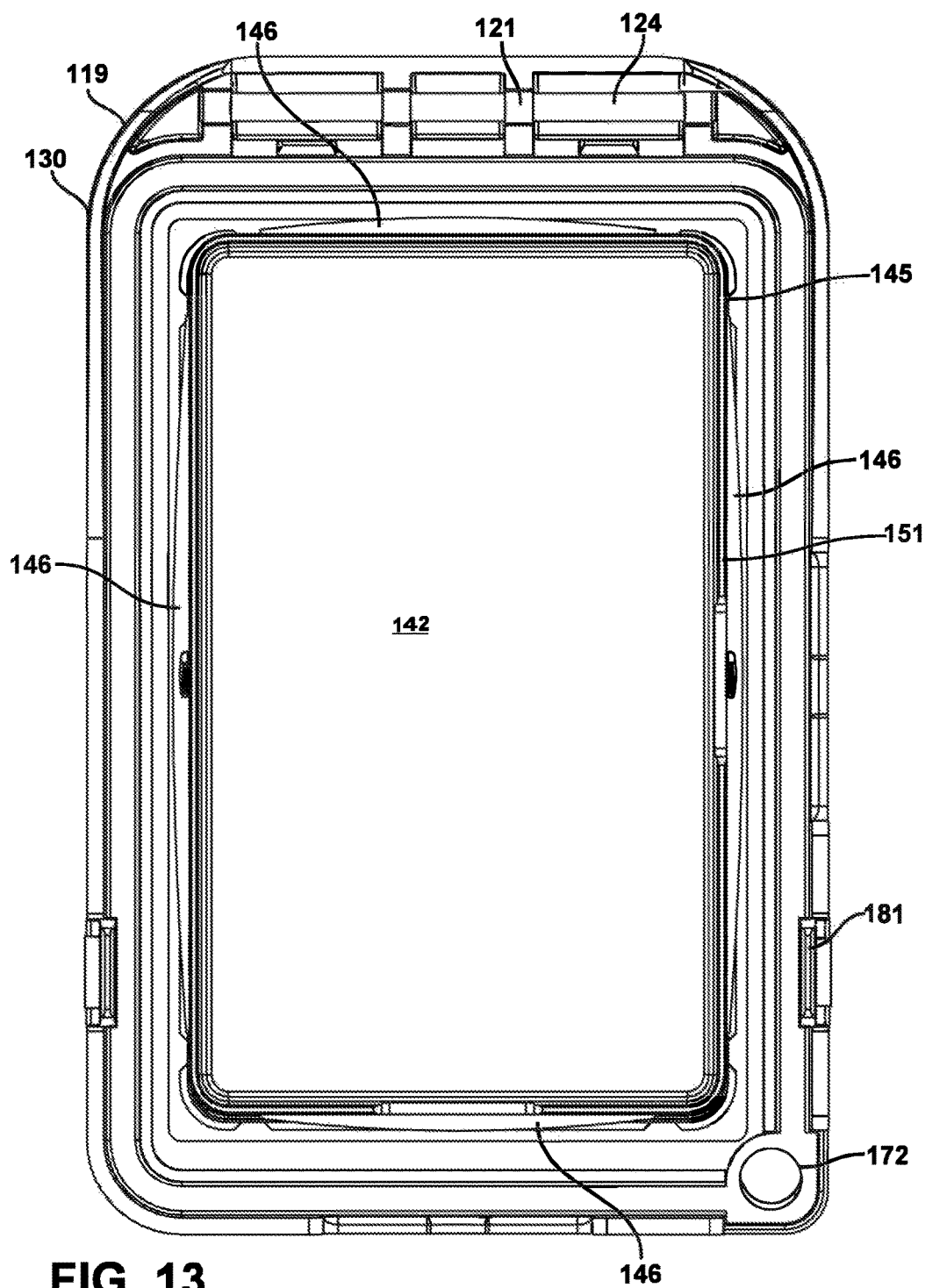
FIG. 13 is a rear view of a lid portion of the outlet cover assembly of FIG. 1.
Figure 14:
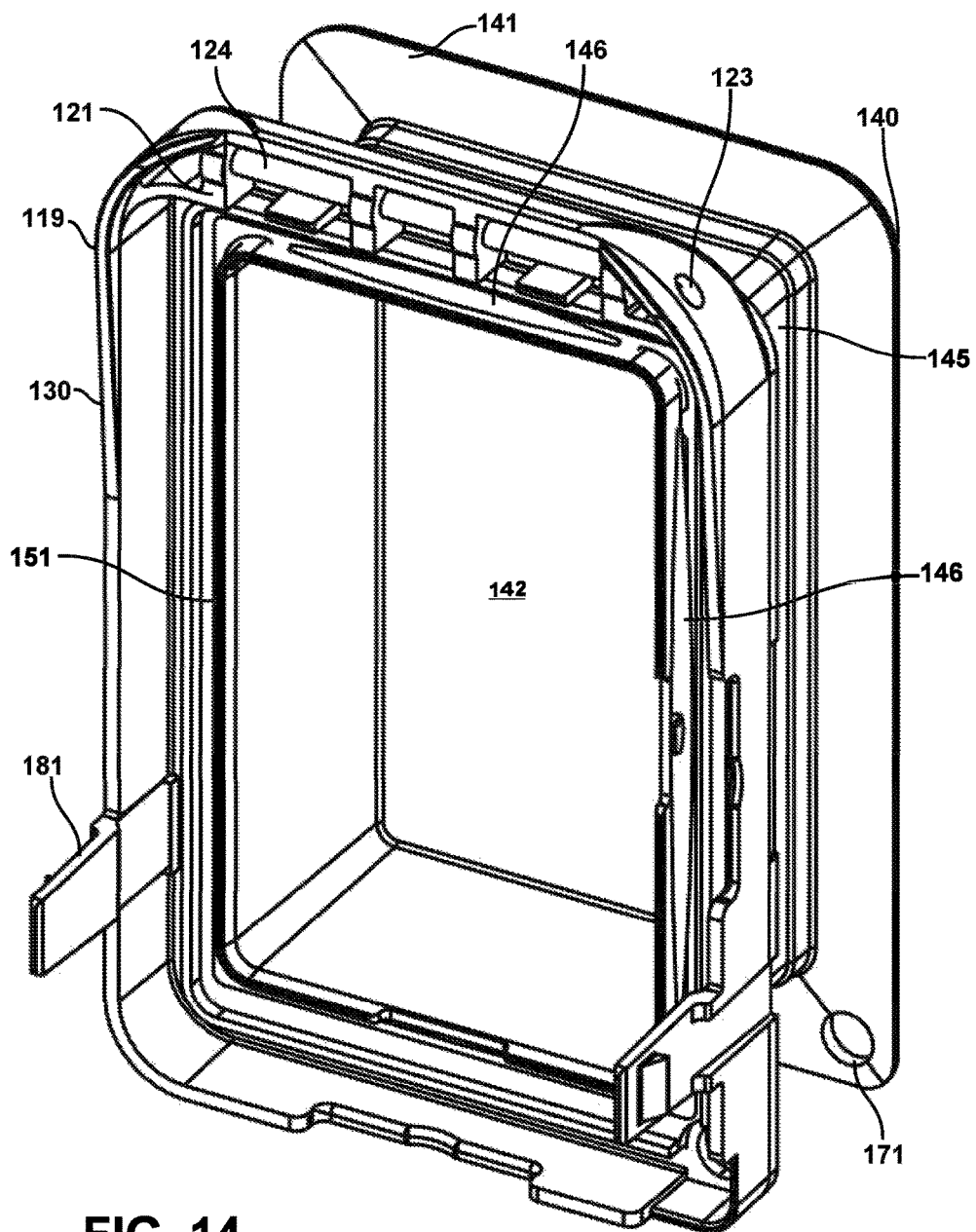
FIG. 14 is a rear perspective view of the lid assembly of FIG. 13.
Figure 15:
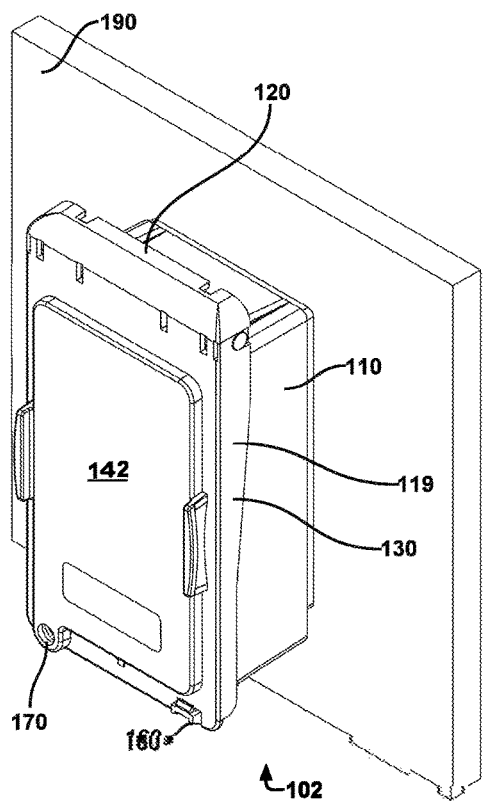
FIG. 15 is a perspective view of an outlet cover assembly configured according to an embodiment of a second approach in a closed collapsed position.
Figure 16:
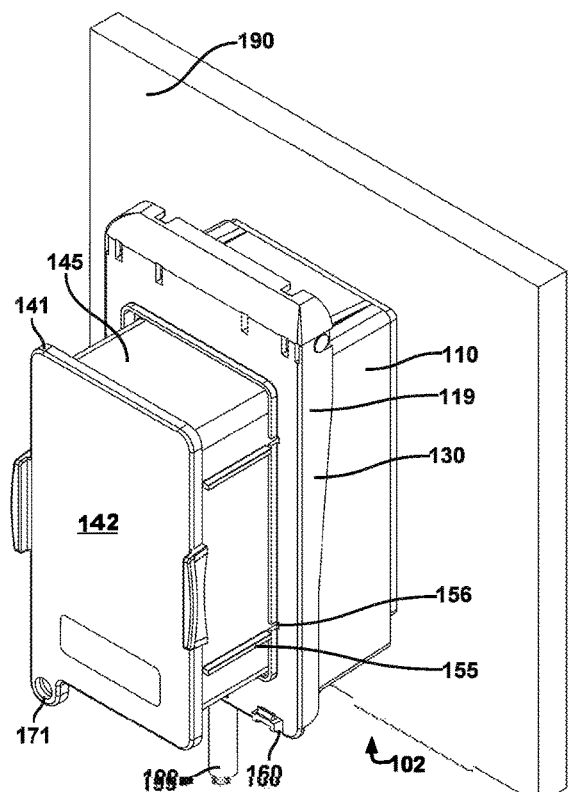
FIG. 16 is a perspective view of the outlet cover assembly of FIG. 15 with the lid in a closed expanded position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of implementations.

DESCRIPTION

This document features a cover for an electrical outlet. There are many features of an outlet cover and method implementations disclosed herein, of which one, a plurality, or all features or steps may be used in any particular implementation.

In the following description, reference is made to the accompanying drawings which form a part hereof, and which show by way of illustration possible implementations. It is to be understood that other implementations may be utilized, and structural, as well as procedural, changes may be made without departing from the scope of this document. As a matter of convenience, various components will be described using exemplary materials, sizes, shapes, dimensions, and the like. However, this document is not limited to the stated examples and other configurations are possible and within the teachings of the present disclosure. As will become apparent, changes may be made in the function and/or arrangement of any of the elements described in the disclosed exemplary implementations without departing from the spirit and scope of this disclosure.

FIGS. 1-6 depict various views of a non-limiting implementation of a cover for an electrical outlet. An example of an electrical outlet cover according to a first approach described herein and generally shown in FIGS. 1-14. Although the particular material from which this outlet cover 101 is formed is not critical to the outlet cover 101, and any materials known in the art that electrical outlet covers are formed from will suffice, this particular approach is particularly useful when manufacturing the cover of plastic commonly used for manufacturing electrical outlet covers. A second approach, illustrated in FIGS. 15-26, is more conducive and useful to manufacturing from metal. Outlet cover 101 includes a base 110 hingedly coupled to a lid 119 (e.g., using hinge assembly 120). The lid 119 includes at least a frame 130. Outlet cover 100 may be attached to an electrical outlet by screwing a screw into box mounting screw holes 114 (FIG. 4A), which attaches outlet cover 101 to an electrical box housing an electrical outlet. A wall plate 190 may be attached to the electrical box or the electrical outlet. The lid 119 may be pivotally lifted from the base 110 to change from a closed position (as in FIGS. 1 and 2) to an open position (as in FIGS. 3 and 5). In the closed position, a latch assembly 180 may lock the lid 119 to the base 110. In the closed position 109, a locking assembly 170 allows a lock or other locking device to be threaded through the locking assembly 170. Further description of this locking assembly 170 is provided below.

The base 110 of outlet cover 100 may include one or more cord ports 116. A cord port door 117 is removably coupled to each cord port 116. The cord port 116 operates to allow a power cord 119 to enter the outlet cover 100 and couple to the electrical outlet. The base 110 includes an outlet aperture 115 to allow the electrical outlet to be accessible through the outlet cover 100. The base 110 may include an insert 113 (FIG. 4A) that allows a variety of different types of electrical outlets to mate with a single type of outlet cover 100. A seal 192 (e.g., a foam seal as in FIG. 11) may protect the base from water and weather by being sandwiched between the back of the base 110 and the adjacent wall or wall plate 190.

A hinge assembly 120 of outlet cover 100 hingedly couples the base 110 to the lid 119. The hinge assembly 120 includes a first hinge member 121 and a second hinge member 122. The hinge assembly 120 may be held together by threading a pin 124 into pin aperture 123 and threading the pin 124 through both the first hinge member 121 and the second hinge member 122. The base may include a trough 118 or similar structure to mate with the lid 119 in a tortuous path that resists the passage of water and dirt when in the closed position.

A locking assembly 170 of outlet cover 100 allows a user to lock or tie off at least two of: the base 110, the frame 130, and a telescoping enclosure 140. An enclosure locking aperture 171 is aligned with both a frame locking aperture 172 and a base locking aperture 173. At least two of apertures 171, 172, and 173 may be positioned in proximity to each other and a locking device may be threaded through the apertures to lock the elements together.

A latch assembly 180 of outlet cover 100 allows the lid 119 to releasably lock to the base 110. The latch assembly 180 may automatically lock when lid 119 is in a closed position 109. The latch assembly 180 may include a lid latch member 181 and a base latch member 182. The latch assembly 180 may be a variety of fasteners, couplers, latches, or the like (e.g., a cantilevered snap-fit latch).

Referring specifically to FIGS. 4-14, outlet cover 101 includes a telescoping enclosure 140 housed within a central aperture 131 of the frame 130. The telescoping enclosure 140 includes an enclosure front wall 142, a sleeve 145 that slides within the central aperture 131 between an expanded position (as in FIGS. 5, 8, 11 and 14) and a collapsed position (as in FIGS. 4, 7 and 12A). In the expanded position, the telescoping enclosure 140 may be held in place in the expanded position by way of couplings, fasteners, and/or friction between the sleeve 145 and the central aperture 131. Various fasteners can hold the telescoping enclosure 140 in the expanded position, such as: snap-fit fasteners, latches, couplers, magnets, or the like. In some embodiments, the frame 130 has a flexible ring 133 with a ridge 132 that mates with a plurality of protrusions 147 on the sleeve 145 so that the protrusions 147 and ridge 132 operate together as an annular snap-fit fastener to hold the telescoping enclosure 140 in the expanded position 148. Thus, sliding sleeve 145 from the collapsed position into the expanded position causes the protrusions 147 to traverse the ridge 132, thereby snap-fitting the telescoping enclosure 140 in the expanded position.

The telescoping enclosure 140 slides between the collapsed position and the expanded position without falling out of the frame 130. The sleeve 145 may include a plurality of ledges 146 near a back portion of the sleeve 145. The ledges 146 increase the diameter of the sleeve 145 to be larger than the central aperture 131, which causes the ledges 146 to catch on the frame 130 and stop outward sliding movement. Thus, one or more ledges 146 may be abutting the frame 130 in the expanded position. In addition, protrusions 147 may be snap-fit with ridge 132 in the expanded position. The flexible ring 133 may have sufficient friction against the sleeve 145 to restrict water from entering the outlet cover 101 when in the expanded position.

Sometimes a user may lose or discard the cord port door 117, which may allow water or dirt to enter the outlet cover 101 unless another element blocks the water and dirt from entering. The telescoping enclosure 140 positioned in the collapsed position (see FIG. 12A) helps restrict water and dirt from entering the outlet cover 101. In some embodiments, telescoping enclosure 140 may include a flange 141 (or another protrusion or lip) that abuts the frame 130 when in the collapsed position 149. The shape of the frame 130 and the flange 141 create a significant obstruction to water and dirt. In certain embodiments, the telescoping enclosure 140 may seat into the base 110 when in the collapsed position. A back edge 151 (FIG. 4A) of the sleeve 145 seats against or abuts the base when in the collapsed position. The back edge 151 may seat in a valley 91 near at least one ridge (e.g., next to ridge 90, between ridge 90 and outer ridge 92, or the like). Back edge 151 seated proximate ridge 90 of the base 110 helps restrict water and dirt from entering and contacting the electrical outlet, and may form a tortuous path for any water or dirt attempting to enter. This beneficial barrier to contaminants entering the enclosure even when the cord ports are open is particularly advantageous. One significant benefit of having the back edge 151 abutting the base 110 is that it doesn't matter if a cord port door 117 is missing because positioning the telescoping enclosure 140 in the collapsed position forms an inner barrier against water and dirt. Thus, water can enter an open cord port 116 and be substantially or entirely blocked from reaching the electrical outlet 115 by a telescoping enclosure 140 in the collapsed position.

FIGS. 15-26 depict various views of a non-limiting implementation of a cover for an electrical outlet. An electrical outlet cover 101 may be formed according to the second approach described herein and generally shown in FIGS. 15-26. Although the particular materials with which this second approach is manufactured is not critical to the operation of the cover and may be formed of plastic or metal or any other materials known in the formation of electrical outlet covers, this approach is particularly advantageous for electrical outlet covers manufactured of metal. Outlet cover 102 is similarly structured to outlet cover 101 in the previous approach, with differences discussed below.

Figure 17:
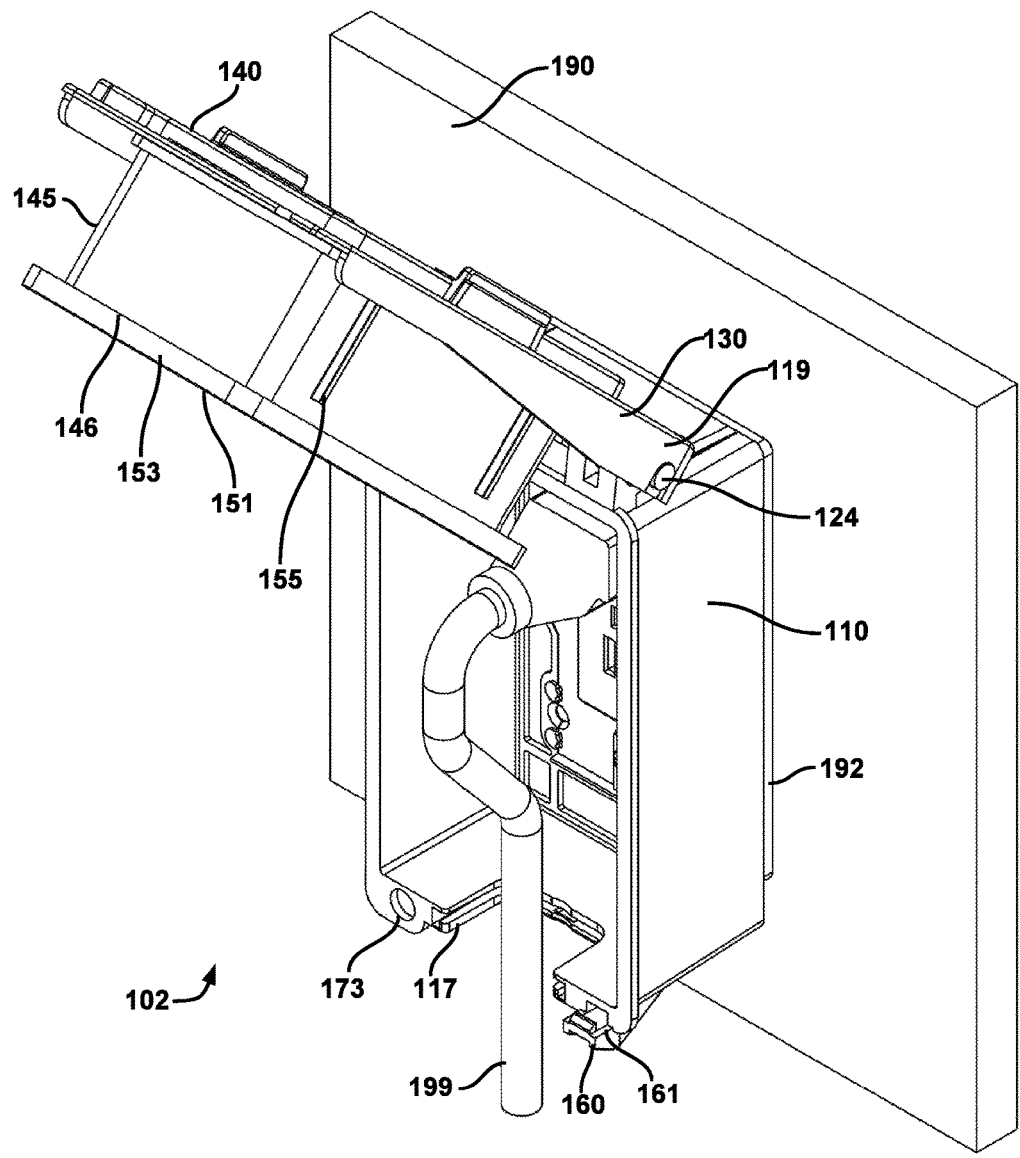
FIGS. 17 and 18 are perspective views the outlet cover assembly of FIG. 15 with the lid in, respectively, an open collapsed position and an open expanded position.
Figure 18:
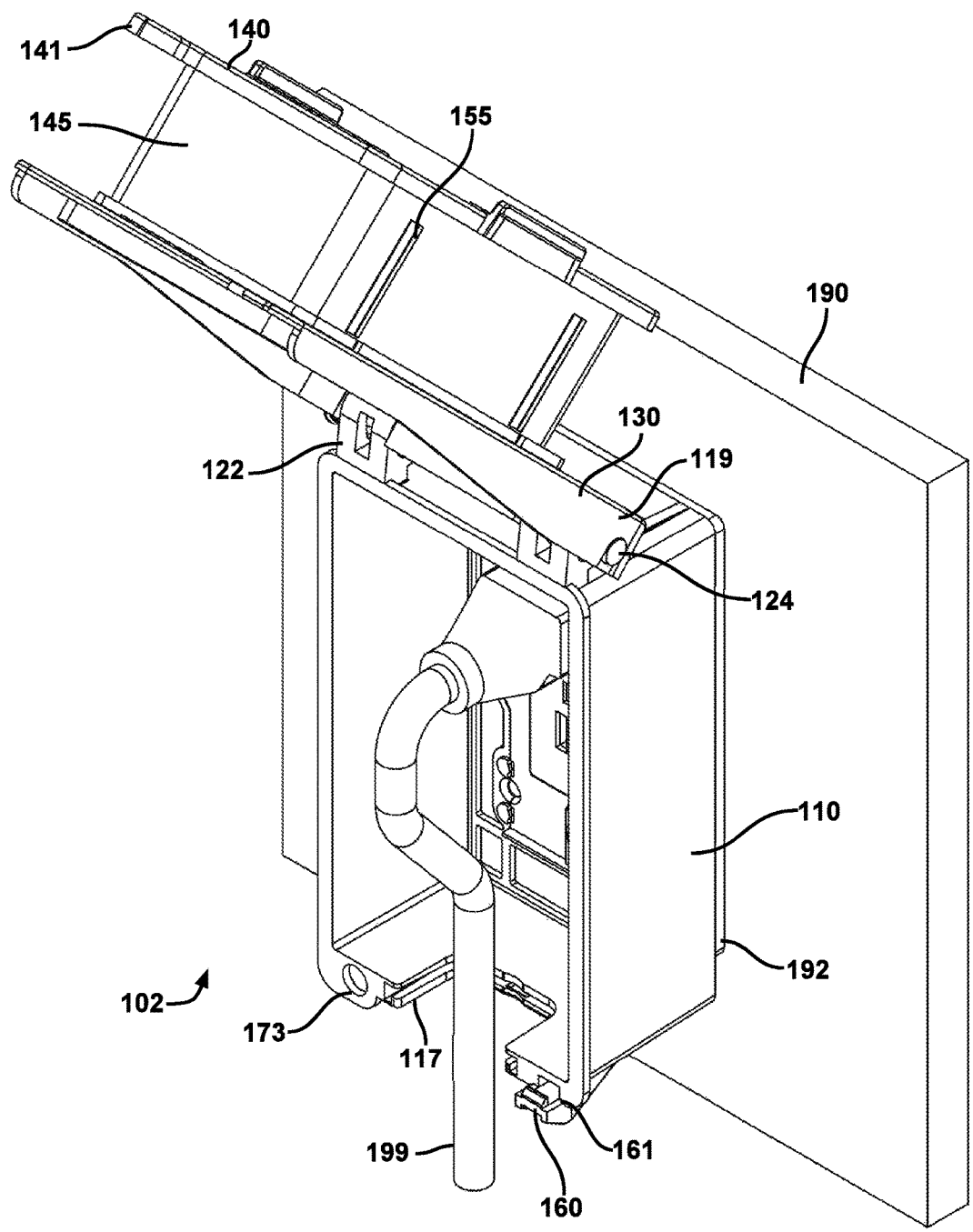
Figure 19:
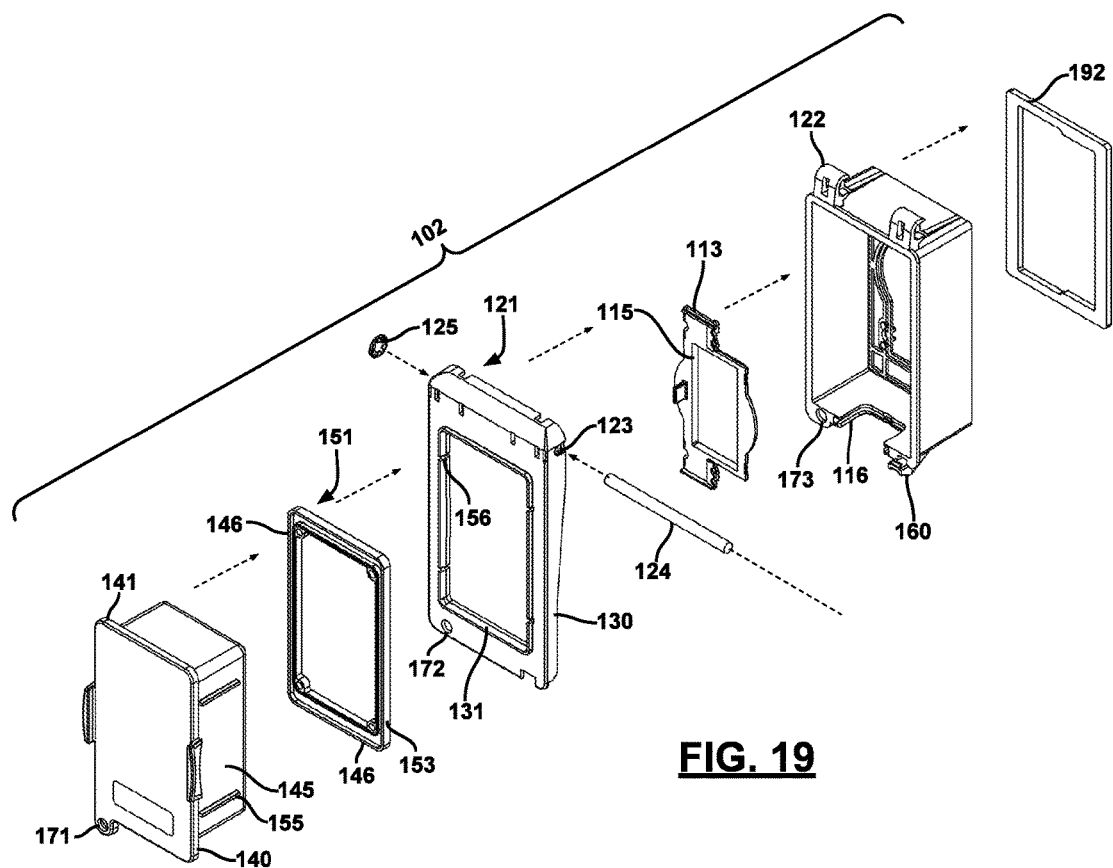
FIG. 19 is an exploded perspective view of the outlet cover assembly of FIG. 15.
Figure 22:
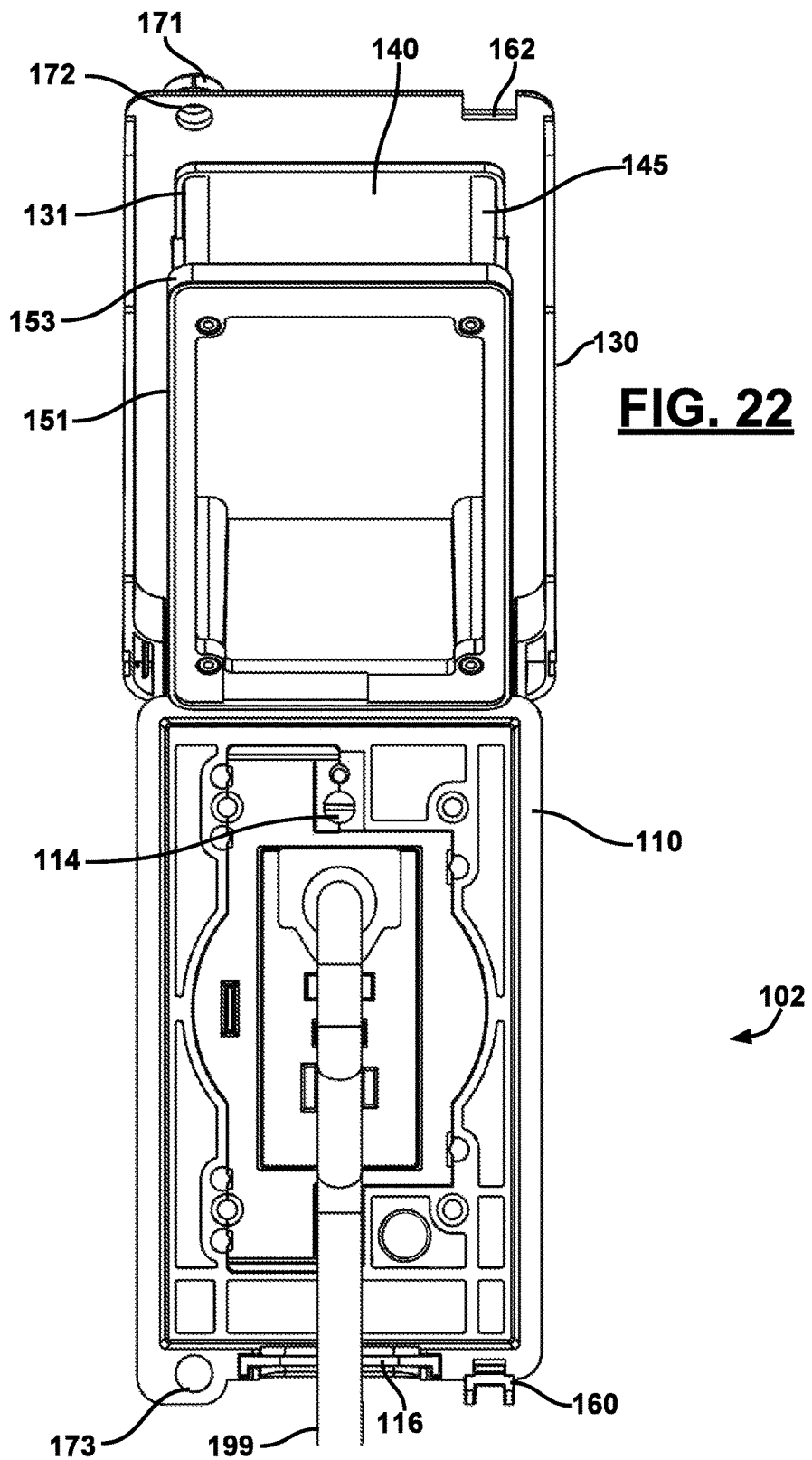
FIG. 22 is a front view of the outlet cover assembly of FIG. 15 with the lid in its open collapsed position.
Figure 23:
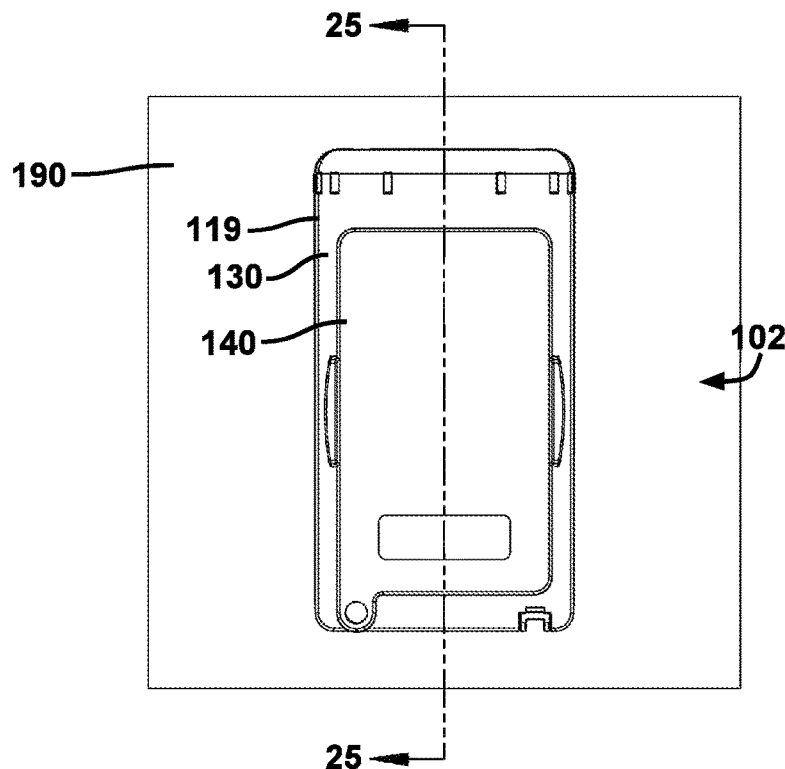
FIG. 23 is a front view of an outlet cover assembly of FIG. 15 shown mounted on a wall.
Figure 24:
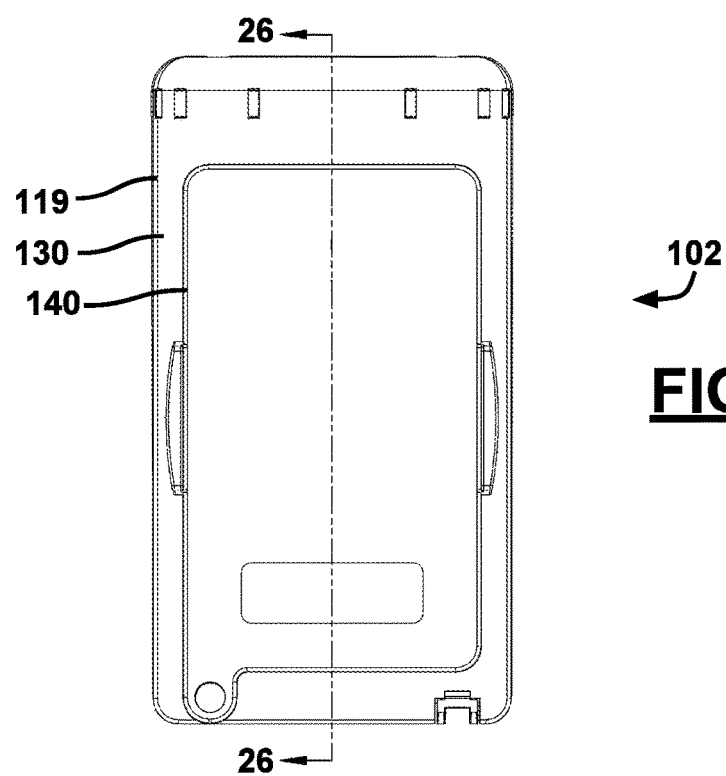
FIG. 24 is a front view of an outlet cover assembly of FIG. 15, not mounted on a wall.
Figure 25:
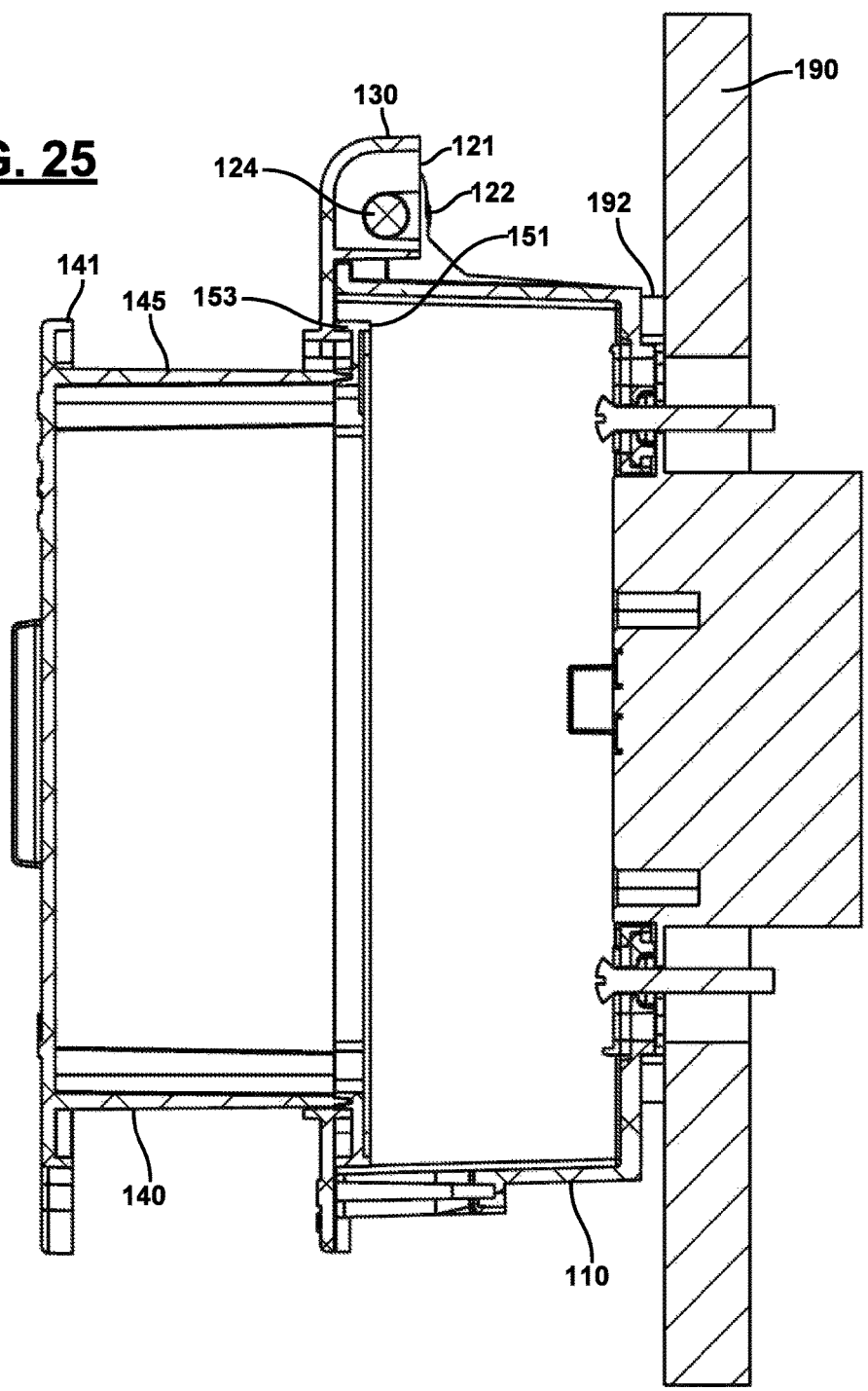
FIG. 25 is a sectional view of FIG. 23, with the section taken along section lines 25-25.
Figure 26:
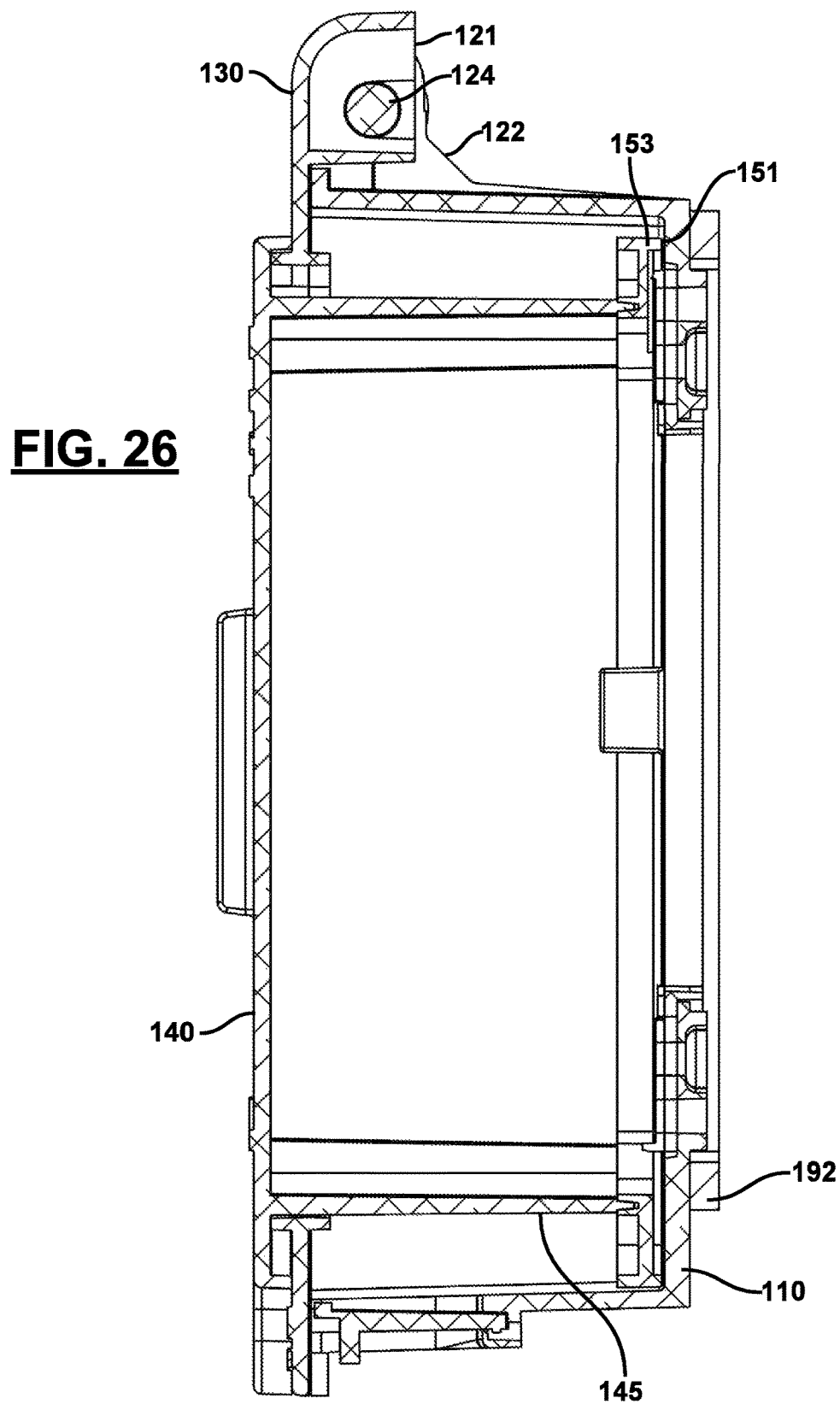
FIG. 26 is a sectional view of FIG. 24, with the section taken along section lines 26-26.

Outlet cover 102 may include a latch assembly 160 that includes a hitch seat 161 (FIG. 17) that mates with the frame 130, for example mating with frame 130 at cutout 162 (FIG. 22). Latch assembly 160 operates by employing a hinge assembly 120 with a pin 124 where there is sufficient vertical movement or "play" for the lid hinge so that when vertically moving the lid 119 in its closed position (FIG. 15 or 16) against the base 110, the cutout 162 unseats from the hitch seat 161 so that the lid 119 can then be pivoted forward to pass over the latch assembly 160 to allow the lid 119 to continue to be lifted into the open position (FIG. 17 or 18).

Figure 20:
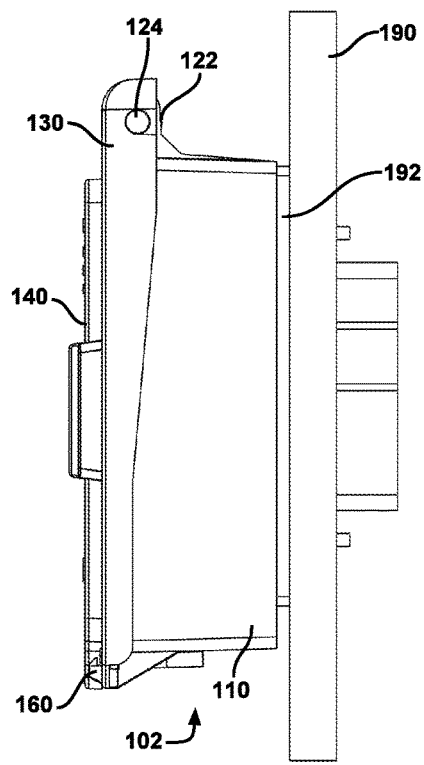
FIGS. 20 and 21 are, respectively, side views of the outlet cover assembly of FIG. 15 in, respectively, the closed collapsed position and the closed expanded position.
Figure 21:
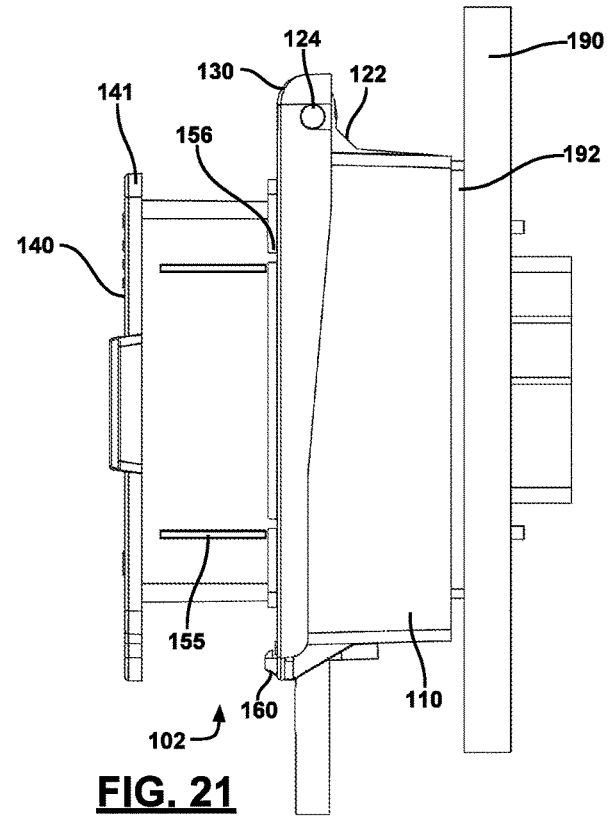

Flange 141 of the telescoping enclosure 140 may have a variety of shapes and sizes. For example, the flange 141 depicted in FIGS. 15-26 has a different shape than the flange 141 depicted in FIGS. 1-14, but both flanges 141 may serve the same purpose and function. It follows that flange 141 of outlet cover 102 also abuts the frame 130 in the collapsed position (FIGS. 17 and 20).

Sleeve 145 may also include a foot assembly 153 (FIG. 17) attached to a back portion of the sleeve. The base of the foot assembly 153 thus becomes the back edge 151 of the sleeve 145. That is, when the sleeve 145 seats down into the base 110 in the collapsed position (see FIG. 26), the back edge 151 of the sleeve 145 is the underside of the foot assembly 153. In addition, the top surface of the foot assembly 153 is labeled as ledge 146 because this top surface of the foot assembly 153 now operates as ledge 146 in outlet cover 102. Thus, foot assembly 153 abuts the frame 130 when the ledge 146 abuts the frame 130 to stop the telescoping enclosure 140 from entirely sliding out of the central aperture 131 in the extended position 148. The ledge 146 may also help form a tortuous path with the frame 130 to restrict entry of water or dirt. The foot assembly 153 may have cavities and a diameter configured to seal or restrict contaminants between the frame 130 and/or the base 110.

Sleeve 145 may include runners 155 that help support the telescoping enclosure 140 within the frame 130 as the runners 155 (FIGS. 19 and 21) slide through channels 156 in the frame 130. The length of the runners 155 may be short enough to allow the telescoping enclosure 140 to slightly fall or slip down when in the extended position 148 (see FIG. 21). This ability to fall or slip down operates to lock the telescoping enclosure 140 in the extended position because a user would need to lift the telescoping enclosure 140 and re-insert the runners 155 into the channels 156 to slide the telescoping enclosure back to the collapsed position. It also assists in locking the telescoping enclosure 140 in the collapsed position for the same reasons.

Each of the embodiments disclosed in FIGS. 27-53 includes a cover for an electrical outlet that has a base with an opening large enough to receive a portion of an electrical device therein, a lid hingedly coupled to the base on one side that can pivot between an open position and a closed position. For each embodiment, the lid of the assembly includes a frame surrounding a central aperture in the frame, with a bubble protruding outward from the frame. For the bubble, by nature of either the lid as a whole or the bubble by itself in relation to the frame, being in a first position, the bubble protrudes outward, away from the base to allow space within the cover assembly in the closed position so that a plug can be plugged into an electrical outlet and the cover closed without interference. When the lid as a whole or the bubble itself in relation to the frame results in the bubble being in a second position, by rotating the bubble 180 degrees in at least one direction, the bubble recedes inward toward the base and when the lid is placed in a closed position the bubble extends into the base. By the bubble having both a first position and a second position in which the bubble can attach to the outlet cover assembly and in the first position it allows for use of the assembly as a weatherproof outlet cover and in the second position it is more compact, blocks the outlet receptacle from use and still closes, the outlet cover assembly provides significant advantage over conventional bubble covers.

FIGS. 27-31 depict various views of a non-limiting implementation of a cover 103 for an electrical outlet. This embodiment shares numerous similarities with the previous two embodiments, but the previous two embodiments differ from this embodiment and the two embodiments following this one by employing a reversible bubble assembly 220 rather than a telescoping enclosure 140. The bubble assembly 220 of outlet covers 103, 104 and 105 can be positioned in a protruding position (see, e.g., FIGS. 28 and 29) and a receding position (see, e.g., FIGS. 30 and 31) rather than an expanded position and a collapsed position as with the telescoping enclosure 140. Each lid 119 in outlet covers 103, 104 and 105 may be arranged in an open position (see, e.g., FIGS. 29 and 31) or a closed position (see, e.g., FIGS. 28 and 30), which may look different than previously described outlet covers 101 and 102 if two hinge assemblies 120 are employed, but the operation is generally the same as described above.

Figure 27:
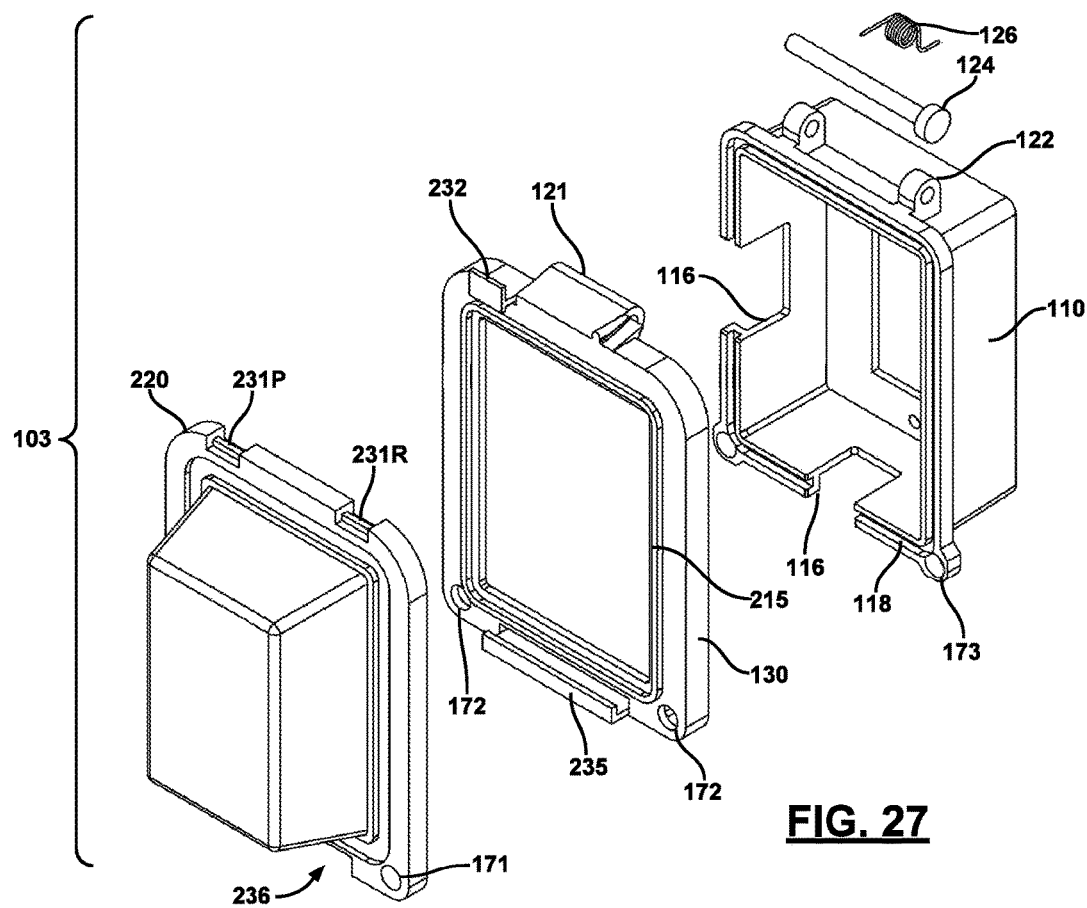
FIG. 27 is an exploded perspective view of an outlet cover assembly with a frame and a removable bubble that seats on the frame.
Figures 30, 31:
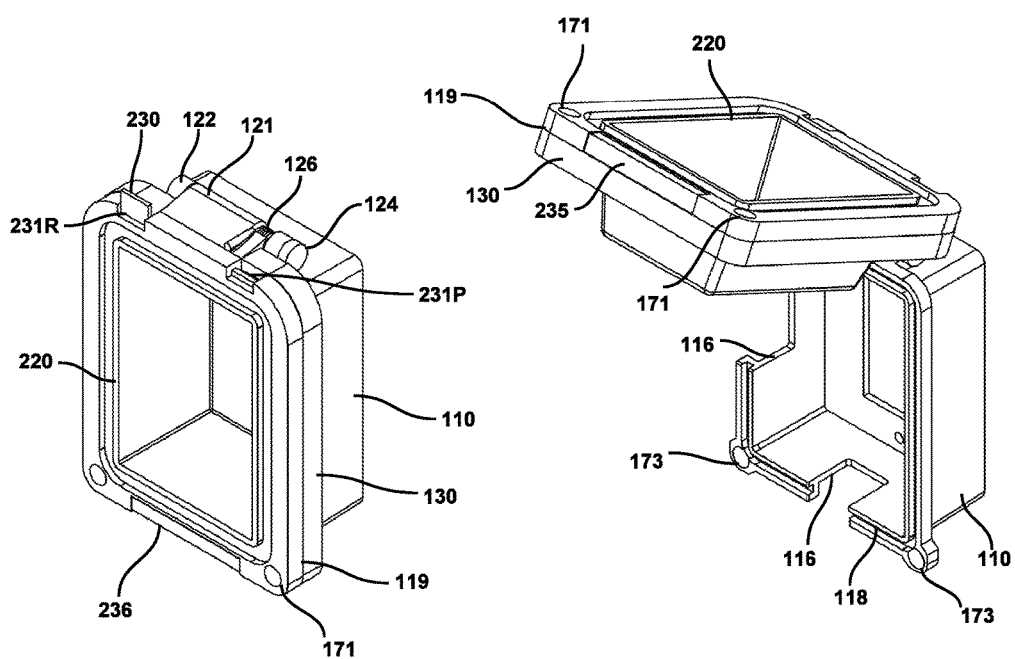
FIG. 30 is a perspective view of the outlet cover assembly of FIG. 27 in the closed receding position.
FIG. 31 is a perspective view of the outlet cover assembly of FIG. 27 in the open receding position.
Figure 32:
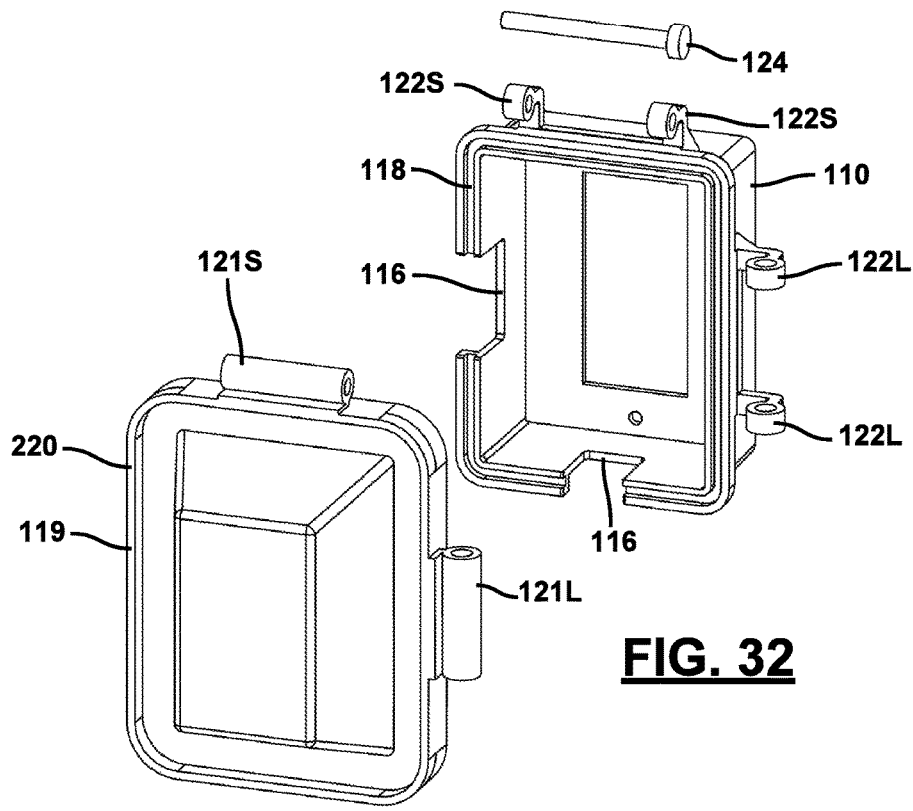
FIG. 32 is an exploded perspective view of an outlet cover assembly with a reversible two-hinged lid mounted in a vertical orientation.
Figures 33, 34:
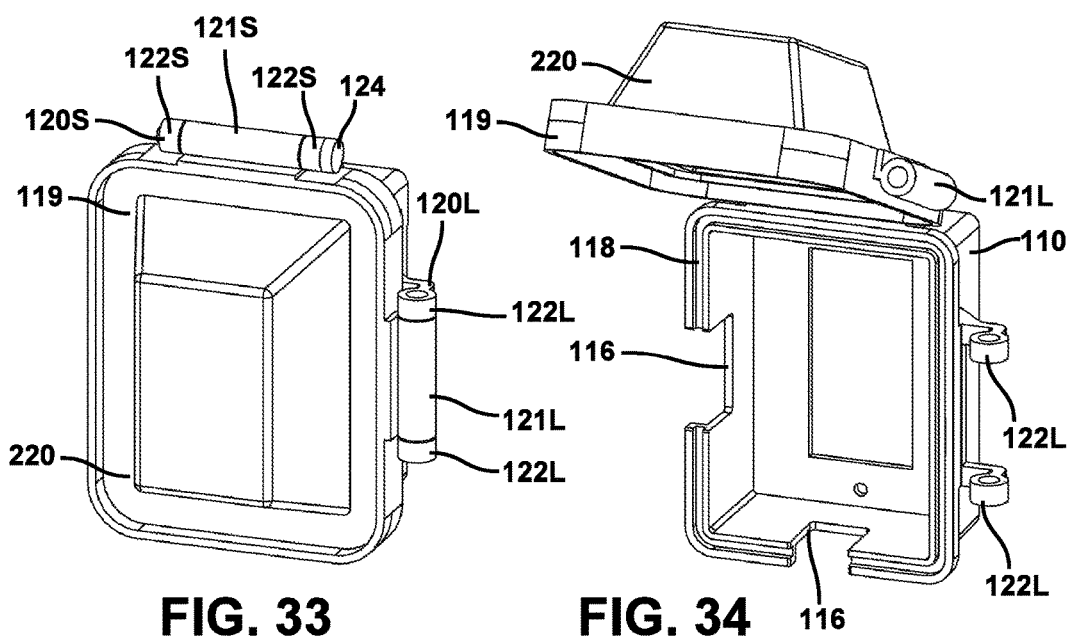
FIG. 33 is a perspective view of the outlet cover assembly of FIG. 32 in the closed protruding position.
FIG. 34 is a perspective view of the outlet cover assembly of FIG. 32 in the open protruding position.
Figure 35:
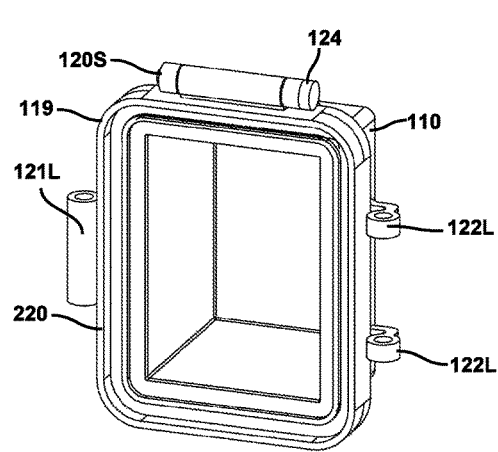
FIG. 35 is a perspective view of the outlet cover assembly of FIG. 32 in the closed receding position.
Figure 36:
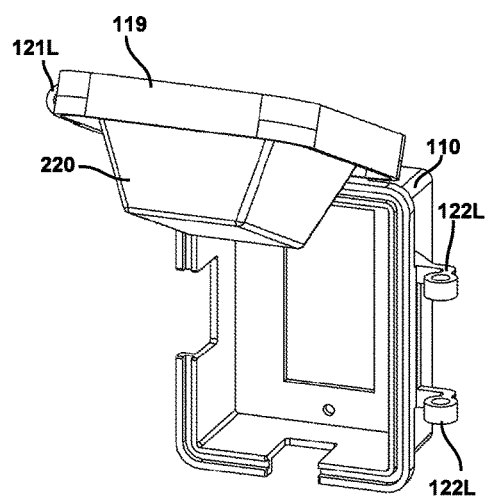
FIG. 36 is a perspective view of the outlet cover assembly of FIG. 32 in the open receding position.
Figure 37:
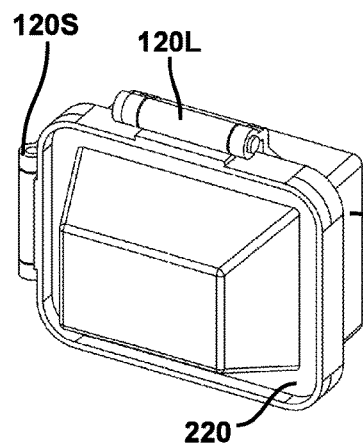
FIG. 37 is a perspective view of the outlet cover assembly of FIG. 32 but mounted in a horizontal orientation with the lid in the closed protruding position.
Figure 38:
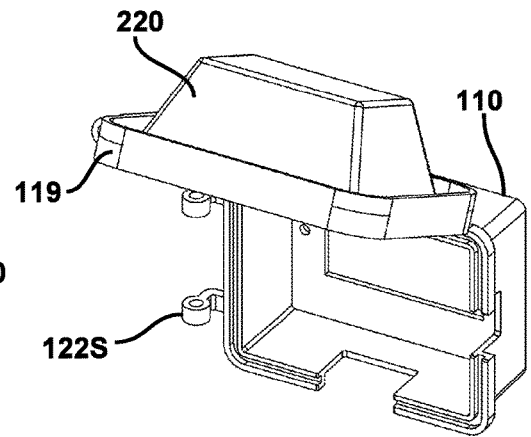
FIG. 38 is a perspective view of the outlet cover assembly of FIG. 32 but mounted in a horizontal orientation with the lid in the open protruding position.
Figure 39:
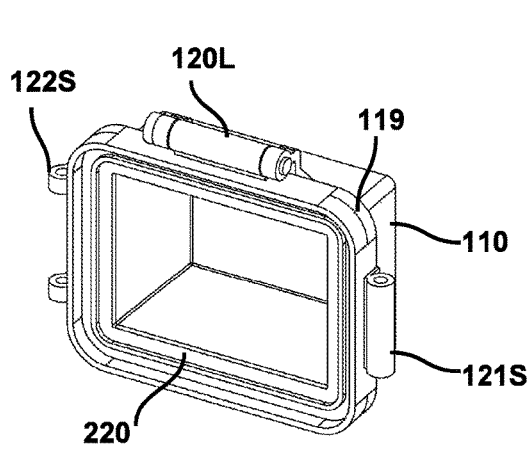
FIG. 39 is a perspective view of the outlet cover assembly of FIG. 32 but mounted in a horizontal orientation with the lid in the closed receding position.
Figure 40:
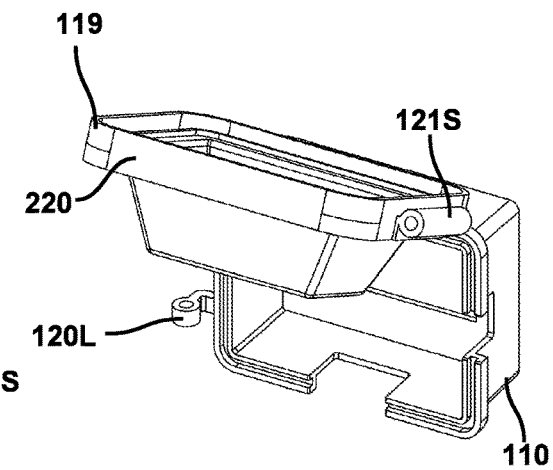
FIG. 40 is a perspective view of the outlet cover assembly of FIG. 32 but mounted in a horizontal orientation with the lid in the open receding position.
Figure 41B:
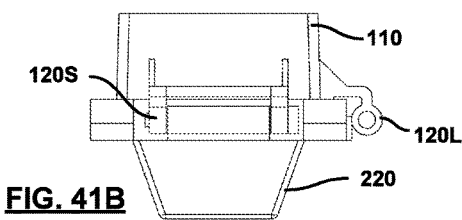
FIG. 41B is a first side view of FIG. 41A.
Figure 41E:
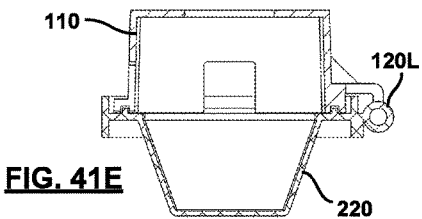
FIG. 41E is a sectional view of FIG. 41A.
Figure 41A:
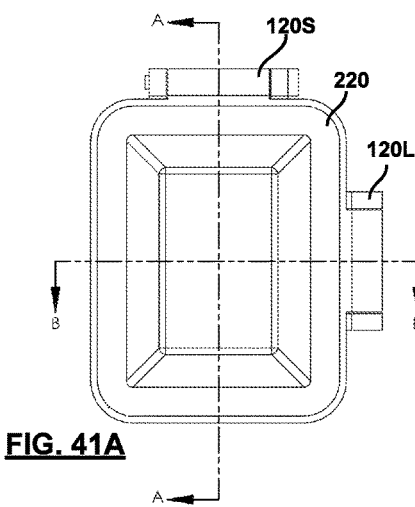
FIG. 41A is a front view of an outlet cover assembly of FIG. 33.
Figure 41C:
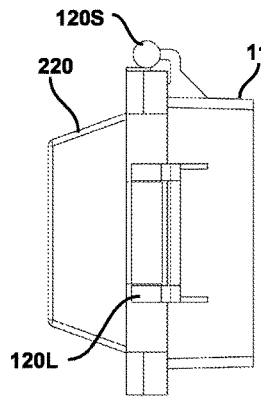
FIG. 41C is a second side view of FIG. 41A.
Figure 41D:
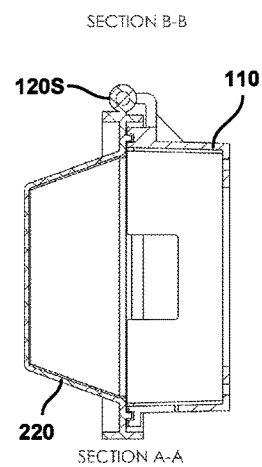
FIG. 41D is a sectional view of FIG. 41A.
Figure 46:
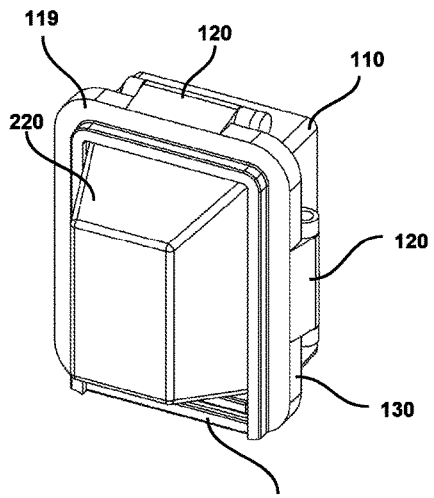
FIG. 46 is a perspective view of the outlet cover assembly of FIG. 45 assembled in a vertical orientation with the bubble and lid in the closed protruding position.
Figure 47:
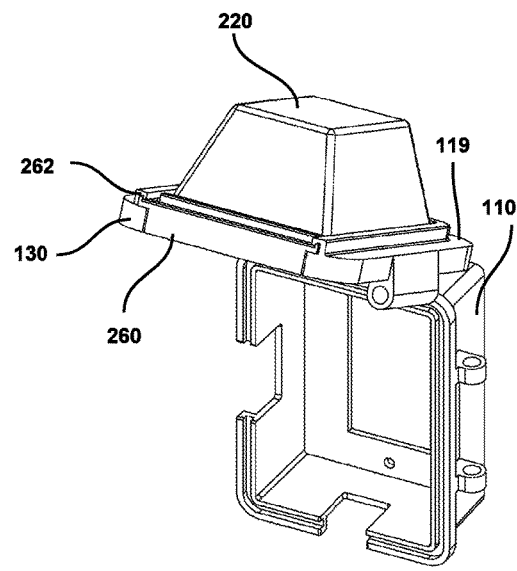
FIG. 47 is a perspective view of the outlet cover assembly of FIG. 45 in the open protruding position.
Figure 50:
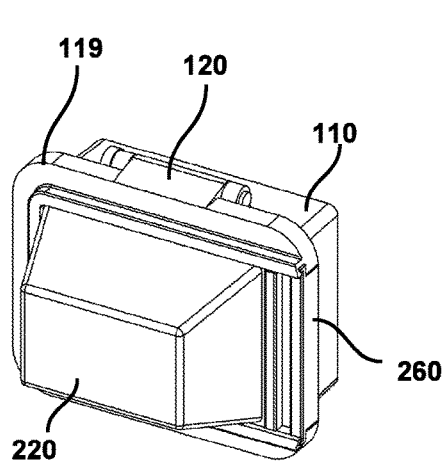
FIG. 50 is a perspective view of the outlet cover assembly of FIG. 45 but mounted in a horizontal orientation with the lid in the closed protruding position.
Figure 51:
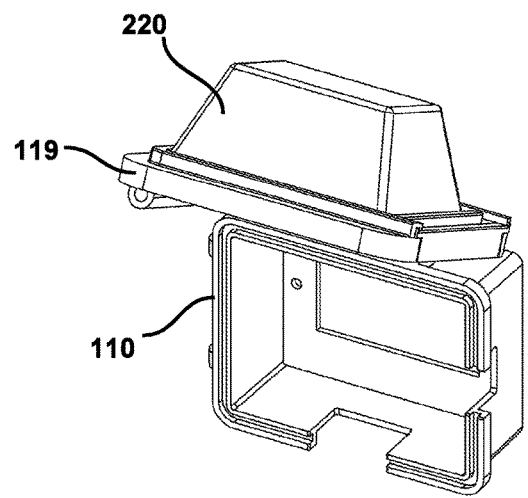
FIG. 51 is a perspective view of the outlet cover assembly of FIG. 45 but mounted in a horizontal orientation with the lid in the open protruding position.
Figure 52:
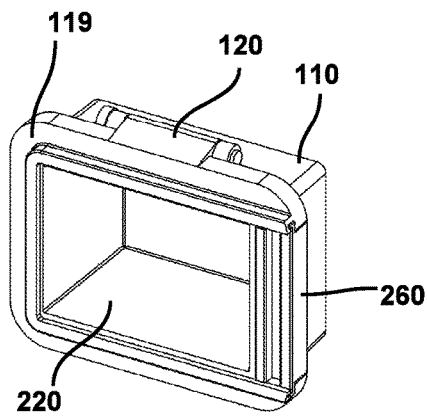
FIG. 52 is a perspective view of the outlet cover assembly of FIG. 45 but mounted in a horizontal orientation with the lid in the closed receding position.
Figure 53:
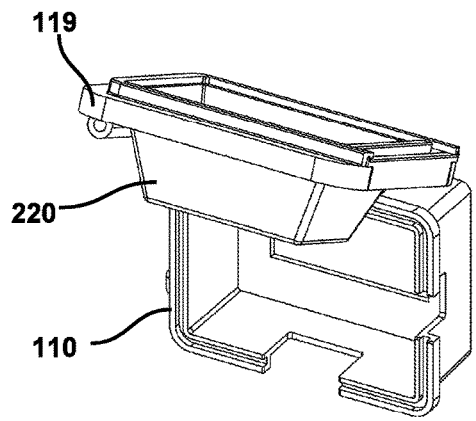
FIG. 53 is a perspective view of the outlet cover assembly of FIG. 45 but mounted in a horizontal orientation with the lid in the open receding position.

As shown in FIG. 27, an outlet cover 103 includes a lid 119 with a detachable and reversible bubble assembly 220. A bottom edge of the bubble assembly 220 includes a lip 236 that seats into slot 235 in either a protruding position (see FIGS. 28 and 29) or in a receding position (see FIGS. 30 and 31). A clip assembly 230 on the frame clips on to the bubble assembly 220. The clip assembly 230 may be a cantilevered snap-fit fastener with a clip 232 that grasps onto a catch 231P (resulting in bubble assembly 220 in a protruding position) or onto a catch 231R (resulting in bubble assembly 220 in a receding position). The bubble assembly 220 may switch between the protruding position and the receding position by simply releasing the clip assembly 230, removing the bubble assembly 220 from the slot 235, rotating the bubble assembly by 180° around the long central axis, re-seating the lip 236 into the slot 235, and then attaching clip assembly 230 to either catch 231R (for receding position) or catch 231P (for protruding position). By configuring the lid frame to receive the bubble cover in either of the first position or the second position, the cover assembly structure is simplified in that cord port covers for the cord ports 116 may not be required. The bubble 225 oriented in the second position (FIGS. 30-31) protects the electrical outlet and acts as at least a partial barrier against water and other contaminants.

In some embodiments, hinge assembly 120 includes a hinge bias member 126, such as a spring, torsion member, or the like. Although not depicted in FIGS. 27-31, the hinge assembly 120 may be positioned on a long edge of the lid 119 and base 110 rather than a short edge (as shown), or, like other embodiments in this disclosure, two hinge assemblies 120 on adjacent sides of the lid and base may be provided.

FIGS. 32-44 depict various views of a non-limiting embodiment of a cover 104 for an electrical outlet. The bubble assembly 220 of the outlet cover 104 can be oriented in a protruding position (see, e.g., FIGS. 33 and 34) or in a receding position (see, e.g., FIGS. 35 and 36). Lid 119 of outlet cover 104 may be pivoted to an open position (see, e.g., FIGS. 34 and 36) or to a closed position (see, e.g., FIGS. 33 and 35) on either of two hinged axes when two hinge assemblies 120 are employed. The general operation and components of an electrical outlet cover of this embodiment is, nevertheless, similar to that described in other embodiments of this disclosure. While not all of the disclosed outlet covers are displayed in this way, any of outlets covers 101, 102, 103, 104, or 105 may be oriented on a wall or wall plate 190 in either a "portrait" or "vertical" orientation (see, e.g., FIGS. 33-36) or a "landscape" or "horizontal" orientation (see, e.g., FIGS. 37-40).

In this particular embodiment, an outlet cover 104 includes a frame 130, a lid 119, and a bubble assembly 220 that may be combined to form an electrical outlet cover assembly. The outlet cover 104 of this particular embodiment comprises two hinge assemblies 120—a first hinge assembly 120L on a long side of the base 110 and lid 119, and a second hinge assembly 120S on a short side of the base 110 and lid 119. Pin 124 may be removed from either hinge assembly 120S or 120L to allow lid 119 to be rotated into various configurations. The pin 124 inserted in hinge assembly 120S configures outlet cover 104 to open in a "portrait"

orientation (see, e.g., FIGS. 33-36). The pin 124 inserted in hinge assembly 120L configures outlet cover 104 to open in a "landscape" orientation (see, e.g., FIGS. 37-40).

For example, the lid 119 and bubble assembly 220 may switch between the protruding position and the receding position in a "portrait" orientation by simply removing the pin 124 from hinge assembly 120S, separating hinge members 121S and 122S, rotating the bubble assembly 220 by 180° around the long central axis, re-joining hinge members 121S and 122S, and then replacing the pin 124 into hinge assembly 120S.

FIGS. 41A-E depict a "portrait" orientation opening outlet cover 104 with the bubble assembly 220 in a protruding position so that the bubble portion of the bubble assembly extends away from the base. FIGS. 42A-F depict a "portrait" orientation opening outlet cover 104 with the bubble assembly 220 in a receding position so that the bubble portion of the bubble assembly extends toward and into the base. FIGS. 43A-F depict a "landscape" orientation opening the outlet cover 104 with the bubble assembly 220 in a protruding position. FIGS. 44A-F depict a "landscape" orientation opening the outlet cover 104 with the bubble assembly 220 in a receding position.

It is particular to note that the hinge assemblies are constructed such that the lid hinge members and the base hinge members can mate with the bubble assembly 220 in either the protruding position or the receding position. By extending the base hinge members away from the base with hinge member arms, and by establishing the lid hinge members so that there is an unimpeded portion so that the lid can close on the base in both the protruding position and in the receding position without interference from any portion of the base. The bubble assembly 220 may switch between the protruding position and the receding position by simply removing the hinge pin 124, removing the bubble assembly 220 from the base, rotating the bubble assembly by 180° around the long central axis or the short central axis (depending upon whether the user wants the cover to be oriented horizontally or vertically and reattaching the hinge pin 124. By configuring the base to receive attachment of the bubble assembly 220 in either a protruding position or a receding position, the cover assembly structure is simplified in that cord port covers for the cord ports 116 may not be required. The bubble oriented in the receding position protects the electrical outlet and acts as at least a partial barrier against water and other contaminants.

FIGS. 45-53 depict various views of a non-limiting implementation of a cover 105 for an electrical outlet. The bubble assembly 220 of outlet cover 105 can be positioned in a protruding position (see, e.g., FIGS. 46 and 47) and a receding position (see, e.g., FIGS. 48 and 49) rather than an expanded position and a collapsed position as with a telescoping enclosure illustrated in the first two embodiments of this disclosure. The lid 119 of the outlet cover 105 may be in an open position (see, e.g., FIGS. 47 and 49) or a closed position (see, e.g., FIGS. 46 and 48), and may comprise one or two two hinge assemblies, but the operation is generally the same as described above in relation to the first two embodiments of this disclosure. While not all of the disclosed outlet covers are displayed in this way, any of outlet covers 101, 102, 103, 104, or 105 may be oriented on a wall or wall plate 190 in either a "portrait" or "vertical" orientation (see, e.g., FIGS. 46-49) or a "landscape" or "horizontal" orientation (see, e.g., FIGS. 50-53).

In outlet cover 105, the lid 119 includes a detachable and reversible bubble assembly 220. A bottom edge of the frame 130 includes a gate 260 that may be removably attached to the frame 130 to allow the bubble assembly 220 to slide into and out of a track 262. Bubble assembly 220 may include a flange 264 sized and shaped to slidably mate with track 262 and form a water resistant barrier. Flange 264 of the bubble assembly 220, if used, slidably fits within track 262 in either the protruding position or in the receding position (by rotating the bubble assembly 220 axially 180°). The gate 260 releasably couples or fastens to the frame 130 using snap-fit couplings or other suitable couplings.

The bubble assembly 220 may switch between the protruding position (FIGS. 46-47 and 50-51) and the receding position (FIGS. 48-49 and 52-53) by removing the gate 260, removing the bubble assembly 220 from the track 262, rotating the bubble assembly by 180° around either the long central axis or the short central axis, reinserting the bubble assembly 220 into the track 262, and then reattaching the gate 260 to the frame 130. By configuring the lid frame to receive the bubble cover in either of the first position or the second position, the cover assembly structure is simplified in that cord port covers for the cord ports 116 may not be required. The bubble assembly 220 oriented in the second position (FIGS. 48-49 and 52-53) protects the electrical outlet and acts as at least a partial barrier against water and other contaminants.

It will be understood that outlet cover implementations are not limited to the specific assemblies, devices and components disclosed in this document, as virtually any assemblies, devices and components consistent with the intended operation of an outlet cover implementation may be utilized. Accordingly, for example, although particular outlet covers, lids, sleeves, latches, snap-fit couplers, hinges, frames, enclosures, bubble covers, housings, joints, protrusions, ledges, clamps, grooves, ridges, couplers, fasteners, power sockets, and other assemblies, devices and components are disclosed, such may include any shape, size, style, type, model, version, class, measurement, concentration, material, weight, quantity, and/or the like consistent with the intended operation of an outlet cover implementation. Implementations are not limited to uses of any specific assemblies, devices and components; provided that the assemblies, devices and components selected are consistent with the intended operation of an outlet cover implementation.

Accordingly, the components defining any outlet cover implementations may be formed of any of many different types of materials or combinations thereof that can readily be formed into shaped objects provided that the components selected are consistent with the intended operation of an outlet cover implementation. For example, the components may be formed of: polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; glasses (such as quartz glass), carbon-fiber, aramid-fiber, any combination thereof, and/or other like materials; composites and/or other like materials; metals, such as zinc, magnesium, titanium, copper, lead, iron, steel, carbon steel, alloy steel, tool steel, stainless steel, brass, tin, antimony, pure aluminum, 1100 aluminum, aluminum alloy, any combination thereof, and/or other like materials; alloys, such as aluminum alloy, titanium alloy, magnesium alloy, copper alloy, any combination thereof, and/or other like materials; any other suitable material; and/or any combination of the foregoing thereof.

For the exemplary purposes of this disclosure, sizing, dimensions, and angles of outlet cover implementations may vary according to different implementations.

Various outlet cover implementations may be manufactured using conventional procedures as added to and improved upon through the procedures described here. Some components defining outlet cover implementations may be manufactured simultaneously and integrally joined with one another, while other components may be purchased pre-manufactured or manufactured separately and then assembled with the integral components. Various implementations may be manufactured using conventional procedures as added to and improved upon through the procedures described here.

Accordingly, manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components.

It will be understood that the assembly of outlet covers are not limited to the specific order of steps as disclosed in this document. Any steps or sequence of steps of the assembly of outlet covers indicated herein are given as examples of possible steps or sequence of steps and not as limitations, since various assembly processes and sequences of steps may be used to assemble outlet covers.

The outlet cover implementations are described being used to configure a lid in various protruding, expanded, receding, or collapsed positions. Nevertheless, implementations are not limited to uses relating to the foregoing. Rather, any description relating to the foregoing is for the exemplary purposes of this disclosure, and implementations may also be used with similar results for a variety of other applications requiring a configurable outlet cover. For example, implementations may be used to adjustably position an outlet cover to, for example: reduce the size for shipping, house ancillary parts in a cavity, winterize an outlet cover, and so on.

What is claimed is:

1. A cover for an electrical outlet, comprising:
   a base configured to couple to an electrical outlet;
   a lid hingedly coupled to the base along a first side of the lid and pivotable between an open position and a closed position, the lid comprising:
      a frame comprising a central aperture surrounded by the frame;
      an enclosure coupled to the frame and extending through the central aperture of the frame, the enclosure comprising a continuous enclosure wall surrounding the enclosure and an enclosure front wall contiguous with the enclosure wall and enclosing a front side of the enclosure, wherein the enclosure is linearly movable relative to the frame between a collapsed, not-in-use position and an extended, in-use position, wherein the enclosure wall is in contact with the frame throughout its movement, the enclosure comprising a ledge extending outward from the enclosure wall adjacent a back edge of the enclosure wall;
   a base locking aperture extending through the base at an edge of the base and a lid locking aperture extending through the frame at an edge of the frame, wherein the lid locking aperture is aligned with the base locking aperture when the lid is in its closed position; and
   an aperture extending through and surrounded by the base, the aperture sized large enough to receive a portion of an electrical device therethrough.

2. The cover of claim 1, wherein a size of a perimeter of the frame is greater than a size of a perimeter of the base so that the edge of the frame overlaps the edge of the base.

3. A cover for an electrical outlet, comprising:
   a base configured to couple to an electrical outlet;
   only one lid frame hingedly coupled to the base along a first side of the lid frame and pivotable between an open position and a closed position, the lid frame comprising a central aperture;
   one enclosure movably coupled to the frame within the central aperture and linearly movable within the lid frame between a collapsed, not-in-use position and an extended, in-use position, wherein the enclosure comprises an enclosure side wall surrounding the enclosure and an enclosure front wall enclosing the front side of the enclosure, the enclosure side wall comprising a ledge extending outward from an enclosure wall adjacent a back edge of the enclosure wall, the ledge positioned adjacent a back side of the frame when the enclosure is in its extended, in-use position and adjacent a front side of the base when in its collapsed, not-in-use position; and
   an aperture extending through the base sized large enough to receive a portion of an electrical device therethrough.

4. The cover of claim 3, further comprising a base locking aperture extending through the base at an edge of the base and a lid locking aperture extending through the lid frame at an edge of the lid frame, wherein the lid locking aperture is aligned with the base locking aperture when the lid frame is in its closed position.

5. The cover of claim 3, wherein a size of a perimeter of the lid frame is greater than a size of a perimeter of the base so that the edge of the lid frame overlaps the edge of the base.

6. A cover for an electrical outlet, comprising:
   a base configured to couple to an electrical outlet;
   only one lid frame hingedly coupled to the base along a first side of the lid frame and pivotable on between an open position and a closed position, the lid frame comprising a central aperture surrounded by the lid frame;
   one enclosure movably coupled to the frame within the central aperture and telescopingly movable within the lid frame between a collapsed, not-in-use position and an extended, in-use position, wherein the enclosure comprises an enclosure side wall surrounding the enclosure and an enclosure front wall enclosing the front side of the enclosure, the enclosure side wall comprising a ledge extending outward from an enclosure wall adjacent a back edge of the enclosure wall, the ledge positioned adjacent a back surface of the frame at the central aperture when the enclosure is in its extended, in-use position and adjacent a front surface of the base when in its collapsed, not-in-use position; and
   an aperture extending through and surrounded by the base, the aperture sized large enough to receive a portion of an electrical device therethrough.

7. The cover of claim 6, further comprising a base locking aperture extending through the base at an edge of the base and a lid locking aperture extending through the lid frame at an edge of the lid frame, wherein the lid locking aperture is aligned with the base locking aperture when the lid frame is in its closed position.

8. The cover of claim 6, wherein a size of a perimeter of the lid frame is greater than a size of a perimeter of the base so that the edge of the lid frame overlaps the edge of the base.

\* \* \* \* \*